United States Patent
Akkarakaran et al.

(10) Patent No.: US 11,160,117 B2
(45) Date of Patent: Oct. 26, 2021

(54) RANDOM ACCESS TECHNIQUES FOR IDLE MODE REQUESTS

(71) Applicant: QUALCOMM Incorporated, San Diego, CA (US)

(72) Inventors: Sony Akkarakaran, Poway, CA (US); Tao Luo, San Diego, CA (US); Xiao Feng Wang, San Diego, CA (US)

(73) Assignee: QUALCOMM Incorporated, San Diego, CA (US)

(\*) Notice: Subject to any disclaimer, the term of this patent is extended or adjusted under 35 U.S.C. 154(b) by 227 days.

(21) Appl. No.: 16/565,181

(22) Filed: Sep. 9, 2019

(65) Prior Publication Data

US 2020/0092917 A1 Mar. 19, 2020

Related U.S. Application Data

(60) Provisional application No. 62/733,457, filed on Sep. 19, 2018.

(51) Int. Cl.
*H04W 74/08* (2009.01)
*H04W 52/02* (2009.01)

(52) U.S. Cl.
CPC ... *H04W 74/0833* (2013.01); *H04W 52/0248* (2013.01)

(58) Field of Classification Search
CPC ......... H04W 52/0216; H04W 52/0229; H04W 52/0248; H04W 52/028; H04W 74/08; H04W 74/0833; Y02D 30/70

See application file for complete search history.

(56) References Cited

U.S. PATENT DOCUMENTS

| | | | | |
|---|---|---|---|---|
| 2005/0075148 A1* | 4/2005 | Park | ............ | H04W 52/0216 455/574 |
| 2009/0209223 A1* | 8/2009 | Kone | ............ | H04B 1/0475 455/343.1 |
| 2009/0296616 A1* | 12/2009 | Lim | ............ | H04W 52/0229 370/311 |

(Continued)

FOREIGN PATENT DOCUMENTS

| | | |
|---|---|---|
| CN | 109314897 A | 2/2019 |
| EP | 3277047 A2 | 1/2018 |

(Continued)

OTHER PUBLICATIONS

International Search Report and Written Opinion—PCT/US2019/050437—ISA/EPO—dated Nov. 22, 2019.

(Continued)

*Primary Examiner* — Gary Mui
(74) *Attorney, Agent, or Firm* — Holland & Hart LLP/Qualcomm

(57) ABSTRACT

Methods, systems, and devices for wireless communications are described that provide for transmission of idle mode requests using random access techniques, and for identifying a response window for a response to idle mode requests. A user equipment (UE) may transmit an idle mode request using random access channel resources, and the response window may be longer than a response window associated with a random access procedure for initial system access. The response window may be determined based at least in part on a base station that is to provide the response to the idle mode request.

30 Claims, 17 Drawing Sheets

(56) References Cited

U.S. PATENT DOCUMENTS

| | | | | |
|---|---|---|---|---|
| 2010/0118797 | A1* | 5/2010 | Park | H04L 1/0033 370/329 |
| 2010/0232330 | A1* | 9/2010 | Cheng | H04W 52/0216 370/311 |
| 2010/0267410 | A1* | 10/2010 | Chin | H04W 52/0216 455/515 |
| 2011/0002253 | A1* | 1/2011 | Cha | H04W 52/0212 370/311 |
| 2018/0220392 | A1 | 8/2018 | Ly | |
| 2018/0317264 | A1* | 11/2018 | Agiwal | H04W 52/50 |
| 2019/0166622 | A1 | 5/2019 | Kim et al. | |
| 2021/0160915 | A1* | 5/2021 | Xu | H04W 74/0833 |

FOREIGN PATENT DOCUMENTS

| | | |
|---|---|---|
| WO | WO-2018028662 A1 | 2/2018 |
| WO | WO-2018143656 A1 | 8/2018 |

OTHER PUBLICATIONS

Samsung: "On Demand SI: Further Details of MSG1 Approach", 3GPP Draft; R2-1704049_On Demand SI_MSG1 Approach Details, 3rd Generation Partnership Project (3GPP), Mobile Competence Centre, 650, Route Des Lucioles, F-06921, Sophia-Antipolis Cedex, France, vol. RAN WG2, No. Hangzhou, China; May 15, 2017-May 19, 2017 May 14, 2017, XP051274662, Retrieved from the Internet: URL:http://www.3gpp.org/ftp/Meetings_3GPP_SYNC/RAN2/Docs/ [retrieved on May 14, 2017], p. 1, lines 8-16, p. 2, lines 1-20, figure 1, 6 pages.

* cited by examiner

RANDOM ACCESS TECHNIQUES FOR IDLE MODE REQUESTS

CROSS REFERENCE

The present application for patent claims the benefit of U.S. Provisional Patent Application No. 62/733,457 by AKKARAKARAN et al., entitled "RANDOM ACCESS TECHNIQUES FOR IDLE MODE REQUESTS," filed Sep. 19, 2018, assigned to the assignee hereof, and expressly incorporated herein.

BACKGROUND

The following relates generally to wireless communications and to random access techniques for idle mode requests.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support random access techniques for idle mode requests in wireless communications. Various described techniques provide for transmission of idle mode requests using random access techniques, and for identifying a response window for a response to idle mode requests. A user equipment (UE) may transmit an idle mode request using random access channel resources, and the response window for the idle mode request may be longer than a response window associated with a random access procedure for initial system access.

In some cases, the response window may be determined based at least in part on a base station that is to provide the response to the idle mode request. For example, in cases where a different base station responds to the idle mode request than receives the idle mode request, the response window may be relatively longer. In cases where a same base station receives the request and provides the response, the response window may be relatively shorter or may be the same as a response window associated with a random access procedure for initial system access. In some cases, a timing delay associated with the response window may be indicated in one or more random access messages. One or more additional random access messages may include the response to the idle mode request, and the UE may enter a power saving mode until the response window for the additional random access messages starts.

A method of wireless communication is described. The method may include transmitting an idle mode request to a first base station using uplink random access channel resources, identifying a response window for monitoring for a response to the idle mode request based on a request type of idle mode request, where the response window includes a first response window associated with a first request type or a second response window associated with a second request type, and the second response window is different than the first response window, and monitoring downlink random access channel resources for the response to the idle mode request based on the identifying.

An apparatus for wireless communication is described. The apparatus may include a processor, memory in electronic communication with the processor, and instructions stored in the memory. The instructions may be executable by the processor to cause the apparatus to transmit an idle mode request to a first base station using uplink random access channel resources, identify a response window for monitoring for a response to the idle mode request based on a request type of idle mode request, where the response window includes a first response window associated with a first request type or a second response window associated with a second request type, and the second response window is different than the first response window, and monitor downlink random access channel resources for the response to the idle mode request based on the identifying.

Another apparatus for wireless communication is described. The apparatus may include means for transmitting an idle mode request to a first base station using uplink random access channel resources, identifying a response window for monitoring for a response to the idle mode request based on a request type of idle mode request, where the response window includes a first response window associated with a first request type or a second response window associated with a second request type, and the second response window is different than the first response window, and monitoring downlink random access channel resources for the response to the idle mode request based on the identifying.

A non-transitory computer-readable medium storing code for wireless communication is described. The code may include instructions executable by a processor to transmit an idle mode request to a first base station using uplink random access channel resources, identify a response window for monitoring for a response to the idle mode request based on a request type of idle mode request, where the response window includes a first response window associated with a first request type or a second response window associated with a second request type, and the second response window is different than the first response window, and monitor downlink random access channel resources for the response to the idle mode request based on the identifying.

In some examples of the method, apparatuses, and non-transitory computer-readable medium described herein, the first request type corresponds to idle mode requests for which the first base station provides the response and the second request type corresponds to idle mode requests for which coordination with a second base station may be performed before providing the response. In some examples of the method, apparatuses, and non-transitory computer-readable medium described herein, the second response window may have a later start time than the first response window, may have a longer duration than the first response window, or combinations thereof.

In some examples of the method, apparatuses, and non-transitory computer-readable medium described herein, the transmitting the idle mode request further may include operations, features, means, or instructions for transmitting an initial idle mode request to the first base station in a first random access message (MSG1). In some examples of the method, apparatuses, and non-transitory computer-readable medium described herein, the response window may be for receiving a random access response message (MSG2) responsive to the MSG1 transmission. Some examples of the method, apparatuses, and non-transitory computer-readable medium described herein may further include operations, features, means, or instructions for transmitting, prior to transmitting the idle mode request, a first random access request message (MSG1) to the first base station and receiving, prior to transmitting the idle mode request and responsive to the MSG1 transmission, a random access response message (MSG2) from the base station, and where the idle mode request to the first base station may be transmitted in a third random access message (MSG3).

In some examples of the method, apparatuses, and non-transitory computer-readable medium described herein, the response window may be different than a random access response window associated with a request for system access that may be transmitted using the uplink random access channel resources. Some examples of the method, apparatuses, and non-transitory computer-readable medium described herein may further include operations, features, means, or instructions for receiving, responsive to the idle mode request, an indication of the response window from the first base station. In some examples of the method, apparatuses, and non-transitory computer-readable medium described herein, the indication of the response window may be received in random access message that indicates the first response window or the second response window for a subsequent random access message that includes the response to the idle mode request. Some examples of the method, apparatuses, and non-transitory computer-readable medium described herein may further include operations, features, means, or instructions for initiating a sleep mode responsive to the indication of the response window and prior to the monitoring for the response to the idle mode request. In some examples of the method, apparatuses, and non-transitory computer-readable medium described herein, the idle mode request includes a request for a positioning reference signal (PRS) from an identified direction.

A method of wireless communication is described. The method may include receiving, at a first base station, an idle mode request from a UE via uplink random access channel resources, identifying a second base station that is to provide information for a response to the idle mode request based on a request type of idle mode request, and coordinating, responsive to the identifying, with the second base station to provide a response to the idle mode request.

An apparatus for wireless communication is described. The apparatus may include a processor, memory in electronic communication with the processor, and instructions stored in the memory. The instructions may be executable by the processor to cause the apparatus to receive, at a first base station, an idle mode request from a UE via uplink random access channel resources, identify a second base station that is to provide information for a response to the idle mode request based on a request type of idle mode request, and coordinate, responsive to the identifying, with the second base station to provide a response to the idle mode request.

Another apparatus for wireless communication is described. The apparatus may include means for receiving, at a first base station, an idle mode request from a UE via uplink random access channel resources, identifying a second base station that is to provide information for a response to the idle mode request based on a request type of idle mode request, and coordinating, responsive to the identifying, with the second base station to provide a response to the idle mode request.

A non-transitory computer-readable medium storing code for wireless communication is described. The code may include instructions executable by a processor to receive, at a first base station, an idle mode request from a UE via uplink random access channel resources, identify a second base station that is to provide information for a response to the idle mode request based on a request type of idle mode request, and coordinate, responsive to the identifying, with the second base station to provide a response to the idle mode request.

Some examples of the method, apparatuses, and non-transitory computer-readable medium described herein may further include operations, features, means, or instructions for transmitting, responsive to the identifying, an indication to the UE of a response window for monitoring for a response to the idle mode request. In some examples of the method, apparatuses, and non-transitory computer-readable medium described herein, the response window may be a second response window associated with the second base station, and where the second response window may have a later start time than a first response window for a random access response of the first base station, may have a longer duration than the first response window, or combinations thereof.

In some examples of the method, apparatuses, and non-transitory computer-readable medium described herein, the response window may be associated with a random access response message (MSG2) that may be responsive to the idle mode request. In some examples of the method, apparatuses, and non-transitory computer-readable medium described herein, the response window may be different than a random access response window associated with a request for system access that may be transmitted using the uplink random access channel resources. In some examples of the method, apparatuses, and non-transitory computer-readable medium described herein, the receiving the idle mode request further may include operations, features, means, or instructions for receiving the idle mode request from the UE in a first random access message (MSG1).

Some examples of the method, apparatuses, and non-transitory computer-readable medium described herein may further include operations, features, means, or instructions for receiving, at the first base station and prior to receiving the idle mode request, a first random access request message (MSG1) from the UE and transmitting, from the first base station, a random access response message (MSG2) to the UE, and where the idle mode request from the UE is received in a third random access message (MSG3).

Some examples of the method, apparatuses, and non-transitory computer-readable medium described herein may further include operations, features, means, or instructions for transmitting an indication to the UE that a response to the idle mode request will be transmitted in a separate random access message. In some examples of the method, apparatuses, and non-transitory computer-readable medium described herein, the idle mode request includes a request for a PRS from an identified direction. In some examples of the method, apparatuses, and non-transitory computer-readable medium described herein, the identifying the second base station may include operations, features, means, or instructions for determining that the second base station may be located in the identified direction. In some examples of the method, apparatuses, and non-transitory computer-readable medium described herein, the identifying the second base station may include operations, features, means, or instructions for coordinating with the second base station via one or more network nodes.

DETAILED DESCRIPTION

Figure 1:
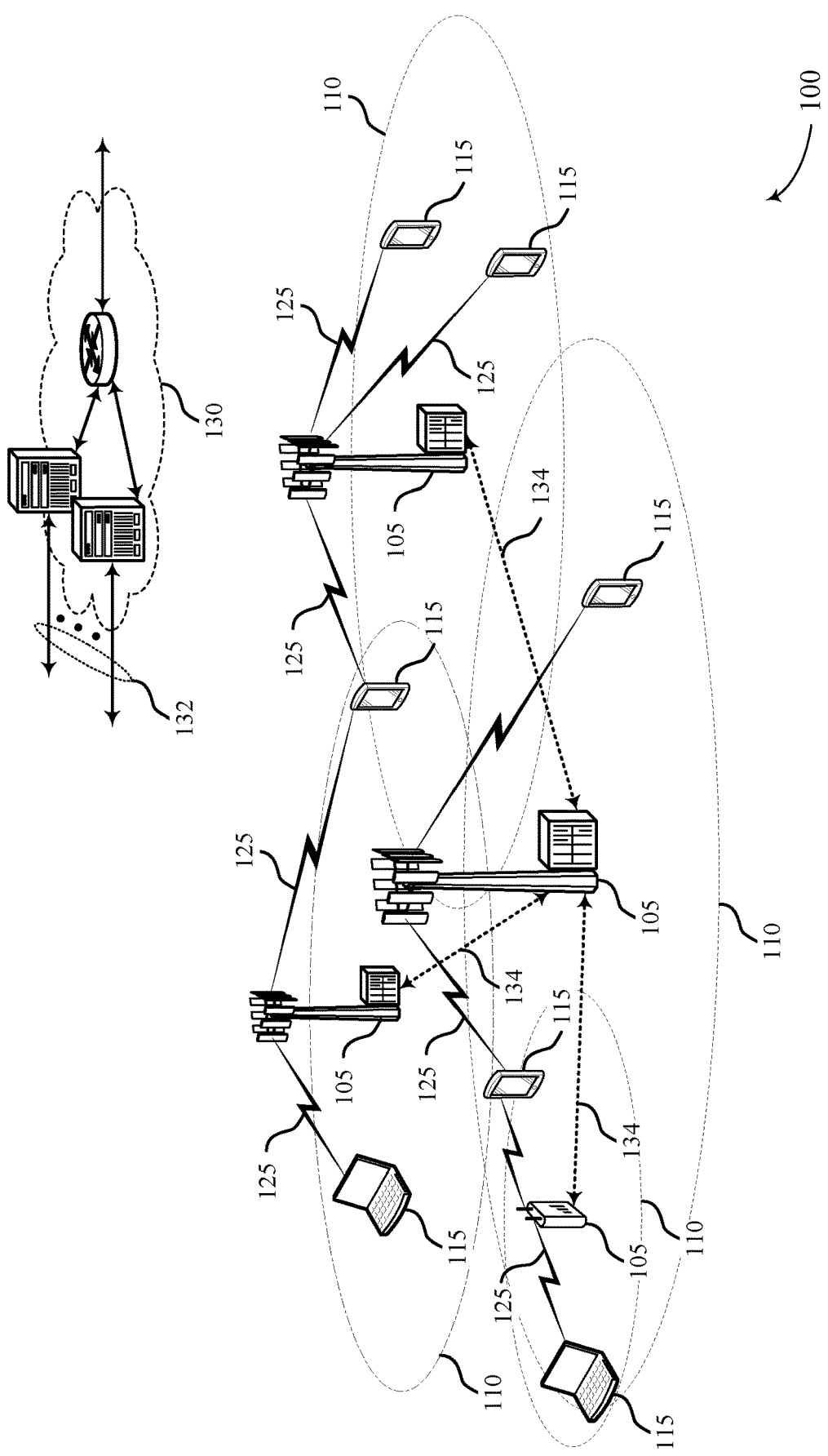
FIG. 1 illustrates an example of a system for wireless communications that supports random access techniques for idle mode requests in accordance with aspects of the present disclosure.

In various aspects of the disclosure, a user equipment (UE) may transmit one or more requests to a base station for information or reference signals associated with the base station. In some cases, the UE may have entered an idle mode that helps power conservation at the UE, and the one or more requests may be transmitted without the UE transitioning to a connected mode. In such cases, the UE may transmit an idle mode request using random access channel resources (e.g., physical random access channel (PRACH) resources). Various described techniques provide for transmission of such idle mode requests and for identifying a response window for a response to the idle mode requests.

The response window for the response may start later and/or be longer than a response window associated with a random access procedure for initial system access. In some cases, the response window may be determined based at least in part on a base station that is to provide the response to the idle mode request. For example, in cases where a different base station responds to the idle mode request than receives the idle mode request, the response window may be relatively longer. In cases where a same base station receives the request and provides the response, the response window may be relatively shorter or may be the same as a response window associated with a random access procedure for initial system access. In some cases, a timing delay associated with the response window may be indicated in one or more random access messages. In some cases, one or more additional random access messages may include the response to the idle mode request, and the UE may enter a power saving mode until the response window for the additional random access messages starts.

In some cases, the idle mode requests may include requests for system information or for reference signal transmissions from a base station. For example, a UE may request system information from a base station, or may request that the base station transmit a positioning reference signal (PRS) that can assist with determining positioning information of the UE. Further, in some cases a request for a PRS may be for a PRS from a different base station than the base station that receives the idle mode request. In such cases, the base station that receives the idle mode request may coordinate with a different base station that is to transmit a response to the idle mode request, and the response window may be determined based on the different base station responding to the request.

Such techniques may allow UEs to transmit requests to a base station while remaining in idle mode. Allowing the UE to remain in idle mode may reduce the UEs power consumption, and may also provide more efficient network operation through reduced signaling associated with transitioning to a connected mode prior to transmitting such a request. For example, if a UE were to transition to connected mode to make a system information or PRS request, the UE would perform a random access procedure to change from the idle mode state to a connected mode state, and then transmit the request to the base station. By using random access resources to transmit such a request, and to provide a response to the request, the UE does not need to transmission to a connected mode, and thereby conserves power through fewer transmissions between the UE and base station. Further, the reduced signaling allows more efficient use of system resources through reduced overhead.

Aspects of the disclosure are initially described in the context of a wireless communications system. Various examples of UE idle mode requests and responses, and process flows for such requests and responses, are then described. Aspects of the disclosure are further illustrated by and described with reference to apparatus diagrams, system diagrams, and flowcharts that relate to random access techniques in wireless communications.

FIG. 1 illustrates an example of a wireless communications system 100 that supports random access techniques for idle mode requests in accordance with aspects of the present disclosure. The wireless communications system 100 includes base stations 105, UEs 115, and a core network 130. In some examples, the wireless communications system 100 may be a Long Term Evolution (LTE) network, an LTE- Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 may transmit idle mode requests to base stations 105 using random access channel resources, and may identify a response window for monitoring for a response to the idle mode requests based at least in part on a request type of the idle mode request.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, as indicated above, a UE 115 may transmit an idle mode request to a base station 105 using random access techniques. A response window may be identified for a response to idle mode requests based on a type of idle mode request, a base station 105 that is to respond to the idle mode request, or any combination thereof. In some cases, a UE 115 may transmit an idle mode request using random access channel resources, and the response window for the may be longer than a response window associated with a random access procedure for initial system access. In some cases, a timing delay associated with the response window may be indicated in one or more random access messages. In some cases, one or more additional random access messages may include the response to the idle mode request, and the UE 115 may enter a power saving mode until the response window for the additional random access messages starts.

Figure 2:
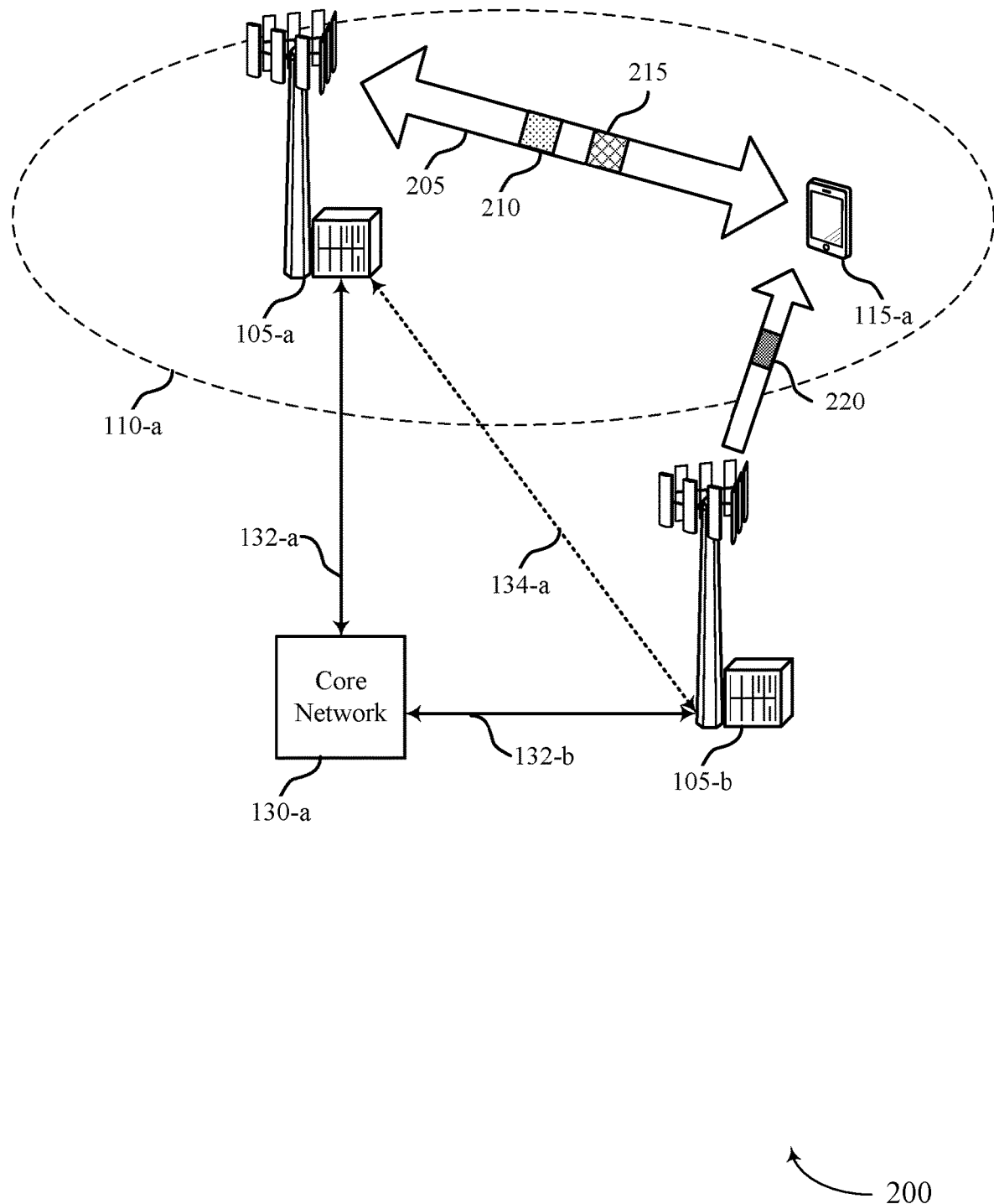
FIG. 2 illustrates an example of a portion of a wireless communications system that supports random access techniques for idle mode requests in accordance with aspects of the present disclosure.

FIG. 2 illustrates an example of a wireless communications system 200 that supports random access techniques for idle mode requests in wireless communications in accordance with aspects of the present disclosure. In some examples, wireless communications system 200 may implement aspects of wireless communications system 100. The wireless communications system 200 may include first base station 105-a, a second base station 105-b, and UE 115-a, which may be examples of base stations 105 and UEs 115, as described with reference to FIG. 1. The first base station 105-a may communicate with the second base station 105-b, in this example, through core network 130-a and backhaul links 132 (e.g., via an S1, N2, N3, or other interface), or backhaul link 134-a (e.g., via an X2, Xn, or other interface).

The first base station 105-a may provide network coverage for geographic coverage area 110-a. The first base station 105-a and UE 115-a may communicate using communication link 205. In this example, the communication link 205 may have configured random access channel resources (e.g., PRACH resources) that may include downlink resources 210 for transmissions from the first base station 105-a to the UE 115-a, and uplink resources 215 for transmissions from the UE 115-a to the first base station 105-a.

As discussed above, in some cases the UE 115-a may transmit an idle mode request using uplink resources 215, that may request information or a reference signal transmission from the second base station 105-b. For example, the UE 115-a may transmit a request for a PRS from the direction of second base station 105-b, which may prompt the second base station 105-b to transmit a PRS 220 to the UE 115-a. Such idle mode requests may use special random access channel messaging to indicate the idle mode request. For example, an idle mode request may use a random access preamble that is associated with the idle mode request (e.g., a first random access preamble may indicate a system information request and a second random access preamble may indicate a PRS for a certain direction is requested). In other cases, a third random access message (e.g., a MSG3 transmission from the UE 115-a to the first base station 105-a) may include the idle mode request in a payload of the random access message.

As also indicated above, in cases where a different base station 105 transmits a response to an idle mode request than receives the idle mode request, additional time for the response may be provided. For example, in cases where the UE 115-a requests a PRS 220 from a certain direction (e.g., from the direction of the second base station 105-b), the first base station 105-a and the second base station 105-b may need to coordinate for the transmission of the PRS 220. In such a case, the UE 115-a may send an idle-mode request for downlink PRS 220 arriving from certain rough direction (e.g., arriving from different elevations, for more accurate height estimation; arriving from a direction that is under-represented in the set of directions from which UE 115-a is able to currently hear good quality PRS signals; or combinations thereof). In some cases, the first base station may receive the request, and may communicate with the second base station 105-b, and in some cases with one or more other base stations, to find the right base station to serve the request, which may take more time than provided for in established random access procedures (e.g., timing for transmissions of MSG1, MSG2, MSG3, and MSG4 according to established LTE or NR random access procedures). The first base station 105-a may communicate with the second base station 105-b via one or more core network 130-a entities (e.g., a mobility management entity (MME) or access and mobility function (AMF)), or directly via backhaul link 134-a (e.g., an X2 or Xn interface). This communication and coordination among multiple base stations may cause delay relative to usual random access situations when all responses come from the same base station. In some cases, the first base station 105-a may determine one or more parameters associated with the PRS 220 of the second base station 105-b (e.g., a bandwidth of the PRS), and may provide the parameters to the UE 115-a in a response to the idle mode request.

In some cases, the response window for the response to the idle mode request may be used by the UE 115-a to monitor for random access response messages. In such cases, a start and duration of a random access response window may depend on the type of idle mode request that was transmitted to the first base station 105-a. For example, different random access requests may be associated with different idle-mode requests and have with different response window (e.g., a PRS request may have a response window that starts later than a random access response window for random access requests for initial system access). In some cases, the response window may be a function of a PRS request type. In such cases, for example, if the UE 115-a is requesting PRS from the first base station 105-a a response window may be set according to random access timing for initial system access, and if the UE 115-a is requesting PRS from a different base station a response window may be set to start later, have a longer duration, or combinations thereof. In some cases, the UE may determine whether the request for PRS will be served by the base station to which the request is sent or by another base station, based on available configuration information in the SIBs acquired from one or more base stations. In some cases, the idle mode request may be transmitted in a first random access message (e.g., in a MSG1 transmissions by selecting a preamble associated with the idle mode request), and the idle mode response may be provided in a second random access message (e.g., in a MSG2 transmission).

In other cases, the first and second random access messages may follow random access timing for initial access, and the idle mode request may be initiated in a third random access message (e.g., in a MSG3 transmission). In this case, the response window for a fourth random access message (e.g., a MSG4 transmission) may be delayed and/or extended depending on the nature of the request (e.g., a request for PRS from a different base station than the first base station 105-a).

In other cases, the idle mode request and idle mode response may span multiple random access messages, and response windows for reception/transmission of each of the subsequent messages after a first random access message may differ from that during initial access random access timing. For example, response windows may depend on the windows, content, or resource allocation of prior messages (e.g., a MSG4 response window may be indicated in a MSG2 transmission, or be determined by MSG2 and MSG3 together).

In further cases, the first four random access messages may follow random access timing for initial system access, and an indication of an action time for a response to the idle mode request may be provided. In such cases, random access message timing may be the same for idle mode requests and for initial system access, and in cases where the response to the idle mode request is delayed more than can be supported by the initial access timing, such a delayed response may be provided in additional random access signaling (e.g., in a fifth or sixth random access message). For example, if the idle mode request from the UE 115-a is a PRS request for a base station in the direction of the second base station 105-b, the first base station 105-a may need time to perform coordination with the second base station 105-b to serve the PRS 220. In such an example, some information may be exchanged in the initial random access messages (e.g., MSG1 indicates PRS request, MSG3 provides more details of request such as PRS bandwidth). In other cases, if the first base station 105-*a* already has prior information on supported PRS configurations of neighboring base stations, this may be indicated in MSG2 or MSG4, and delayed configuration information may be provided later, via separate messaging, and the timing of the separate messaging may be provided to the UE 115-*a* (e.g., in MSG2 or MSG4). In some cases, if the delay before the separate messaging is relatively long, the UE 115-*a* may go back to sleep and into a power savings mode until the start of the response window of the separate messaging.

Figure 3:
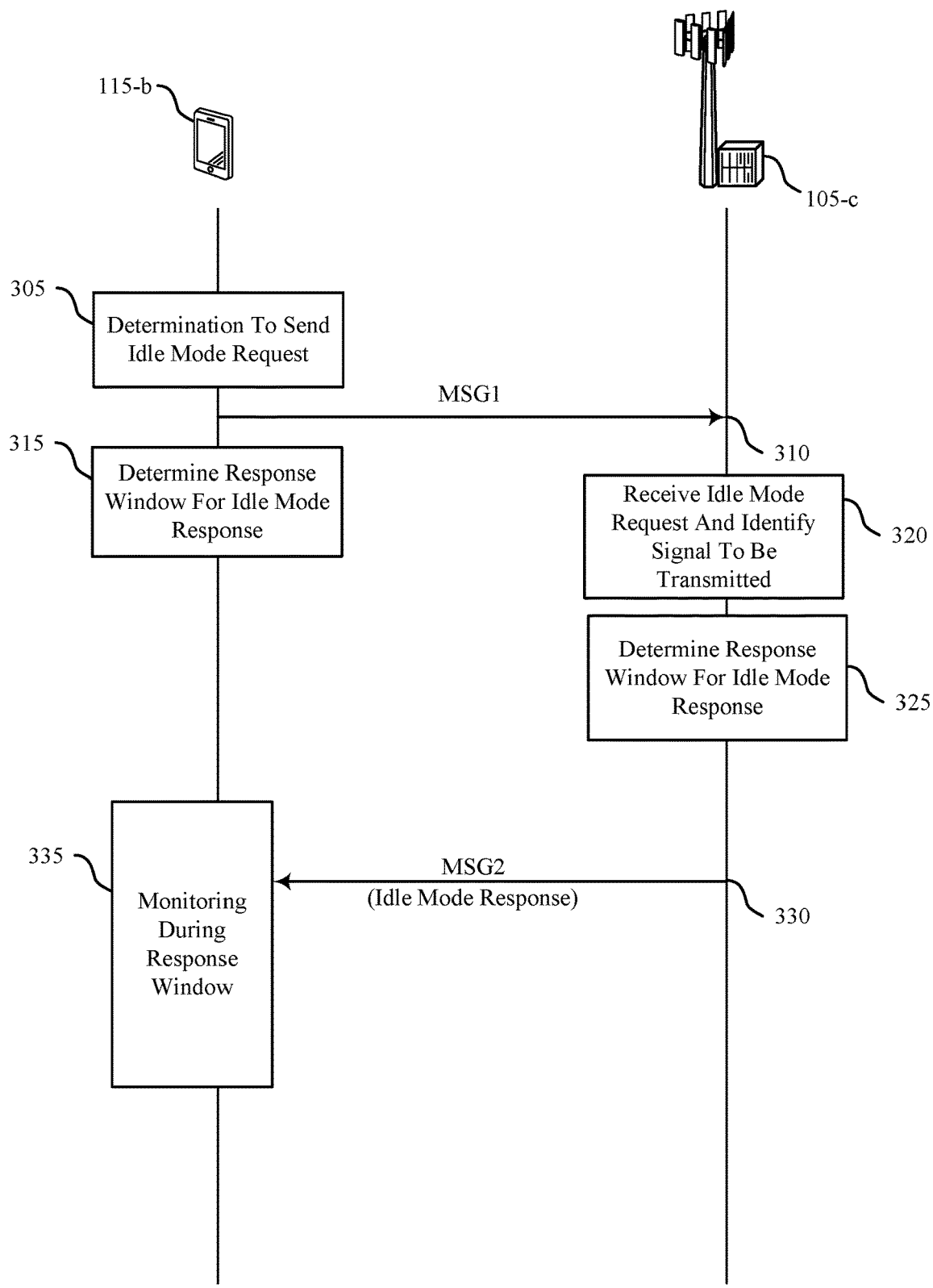
FIG. 3 illustrates an example of a process flow that supports random access techniques for idle mode requests in accordance with aspects of the present disclosure.

FIG. 3 illustrates an example of a process flow 300 that supports random access techniques for idle mode requests in accordance with aspects of the present disclosure. In some examples, process flow 300 may implement aspects of wireless communications system 100 or 200. Process flow 300 includes a UE 115-*b* and a base station 105-*c*, which may be respective examples of a UE 115 and a base station 105 as described with reference to FIGS. 1 and 2.

At 305, the UE 115-*b* may determine to send an idle mode request. In some cases, the UE 115-*b* may have entered idle mode after being in a connected mode with the base station 105-*c*. In some cases, the UE 115-*b* may determine that additional information is needed for maintaining efficient connectivity with the network, such as updated or additional system information, or additional positioning information to determine a more accurate UE 115-*b* position. The UE 115-*b* may transmit the idle mode request in a MSG1 transmission 310, in this example. In some cases, a certain preamble, or a certain set of preambles, may be used to indicate an idle mode request (e.g., a set of preambles may be associated with a PRS request from a general direction, and a different set of preambles may be associated with a system information request).

At 315, the UE 115-*b* may determine a response window for the idle mode request. In some cases, the UE 115-*b* may determine the response window based on a type of idle mode request, such as a first response window for a system information request and a second response window for a PRS request.

At 320, the base station 105-*c* may receive the idle mode request and identify a response that is needed. In some cases, the base station 105-*c* may determine the type of idle mode request based on a random access preamble that was used in the random access message.

At 325, the base station 105-*c* may determine the response window for the idle mode response. In some cases, the base station 105-*c* may determine the response window based on a type of idle mode request, such as a first response window for a system information request and a second response window for a PRS request. The base station 105-*c* may transmit the idle mode response in a MSG2 transmission 330. At 335 the UE 115-*b* may monitor for the idle mode response during the determined response window. In some cases, the idle mode response may include information (e.g., resources and timing) for the UE 115-*b* to receive the requested information from the idle mode request (e.g., a system information transmission or a PRS transmission).

Figure 4:
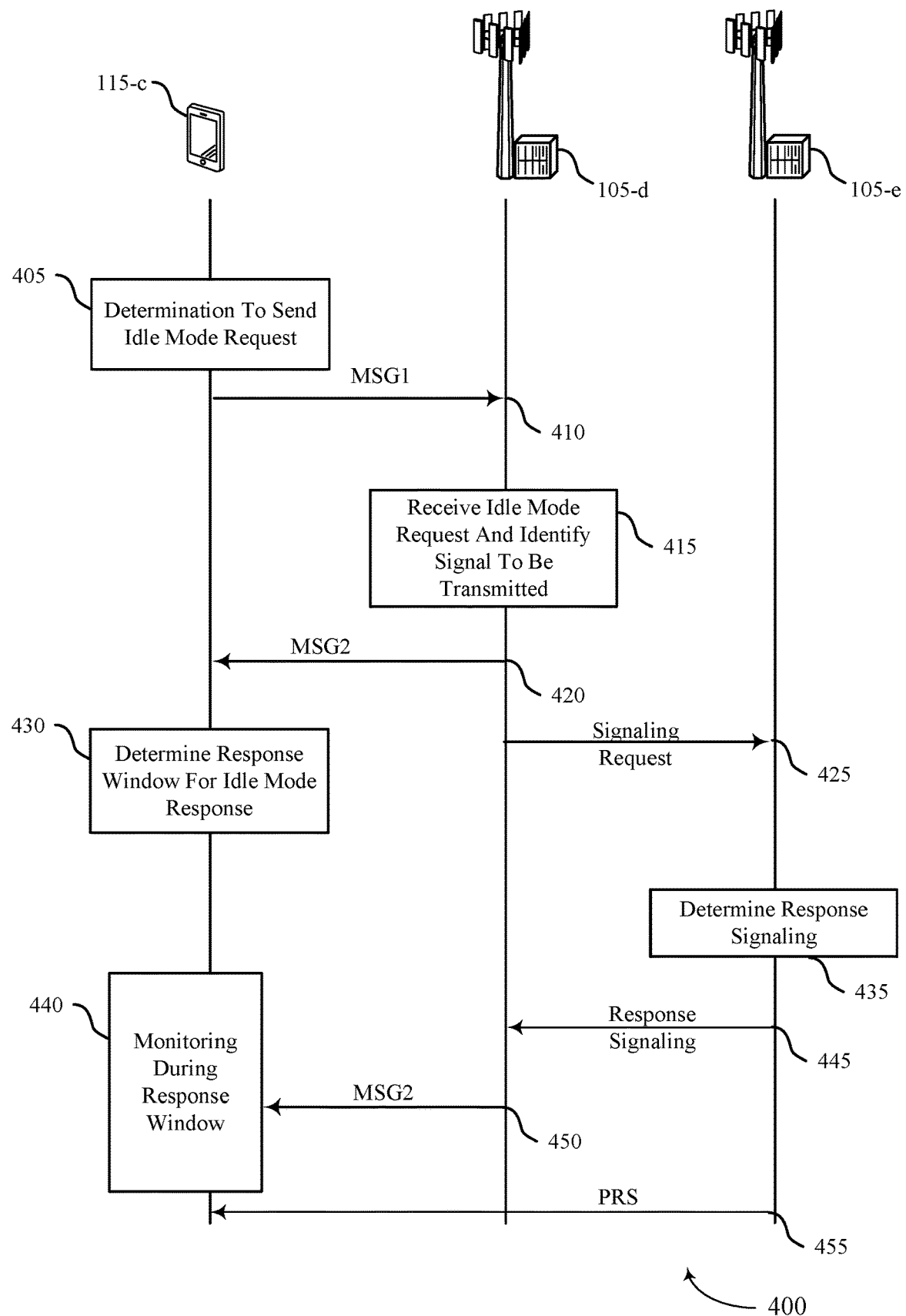
FIG. 4 illustrates an example of a process flow that supports random access techniques for idle mode requests in accordance with aspects of the present disclosure.

FIG. 4 illustrates an example of a process flow 400 that supports bandwidth configuration techniques in wireless communications in accordance with aspects of the present disclosure. In some examples, process flow 400 may implement aspects of wireless communications system 100 or 200. Process flow 400 includes a UE 115-*c*, a first base station 105-*d*, and a second base station 105-*e*, which may be respective examples of a UE 115 and a base station 105 as described with reference to FIGS. 1 and 2.

At 405, the UE 115-*c* may determine to send an idle mode request. In some cases, the UE 115-*c* may have entered idle mode after being in a connected mode with the base station 105-*d*. In some cases, the UE 115-*c* may determine that additional information is needed for maintaining efficient connectivity with the network, such as updated or additional system information, or additional positioning information to determine a more accurate UE 115-*c* position (e.g., a PRS from the direction of the second base station 105-*e*). The UE 115-*c* may transmit the idle mode request in a MSG1 transmission 410, in this example. In some cases, a certain preamble, or a certain set of preambles, may be used to indicate an idle mode request (e.g., a set of preambles may be associated with a PRS request from a general direction, and a different set of preambles may be associated with a system information request).

At 415, the first base station 105-*d* receive the idle mode request and identify a response that is needed. In some cases, the base station 105-*d* may determine the type of idle mode request based on a random access preamble that was used in the random access message.

At 420, the base station 105-*d* may transmit a MSG2 transmission to the UE 115-*c*. In some cases, the MSG2 transmission may indicate resources that are to be monitored by the UE 115-*c* for a subsequent MSG3 transmission.

At 425, the first base station 105-*d* may transmit a signaling request to the second base station 105-*e*. In some cases, the idle mode request may be a request for a PRS from a certain direction, and the first base station 105-*d* may identify the second base station 105-*e* based on the idle mode request.

At 435, the second base station 105-*e* may determine a response signal based on the signaling request. In some cases, the response signal may indicate resources and bandwidth for a PRS transmission of the second base station 105-*e*. The second base station 105-*e* may transmit the response signaling 445 to the first base station 105-*d*.

At 440, the UE 115-*c* may determine a response window for the idle mode request. In some cases, the UE 115-*c* may determine the response window based on a type of idle mode request, such as a first response window for a system information request and a second response window for a PRS request.

At 450, the first base station 105-*d* may transmit MSG2, which may include the idle mode response to the UE 115-*c*. The second base station 105-*e* may transmit PRS 455 and the UE 115-*c* may monitor for the PRS based on the idle mode response. In some deployments (e.g., deployments according to 3GPP NR release 15 specifications) initial access or idle mode system information requests generate one MSG2 response for each MSG1 random access request transmission. In the example of FIG. 4, in such deployments, the MSG2 response may be split into two MSG2 responses, one acknowledging the receipt of MSG1 that is transmitted at 450, and the other providing the response to the desired request (e.g., the PRS 455 response to the on-demand PRS request of MSG1). In some cases, the two parts of the MSG2 in such a scheme may correspond to the physical downlink control channel (PDCCH) and the physical downlink shared channel (PDSCH) of a single grant, that is transmitted with large 'k0' delay (i.e., delay between PDCCH and PDSCH). The k0 delay could be based on one or more of the PDCCH payload contents, PDCCH resource allocation, configuration information in SIBs, the type of the MSG1 idle-mode request, or any combinations thereof.

Figure 5:
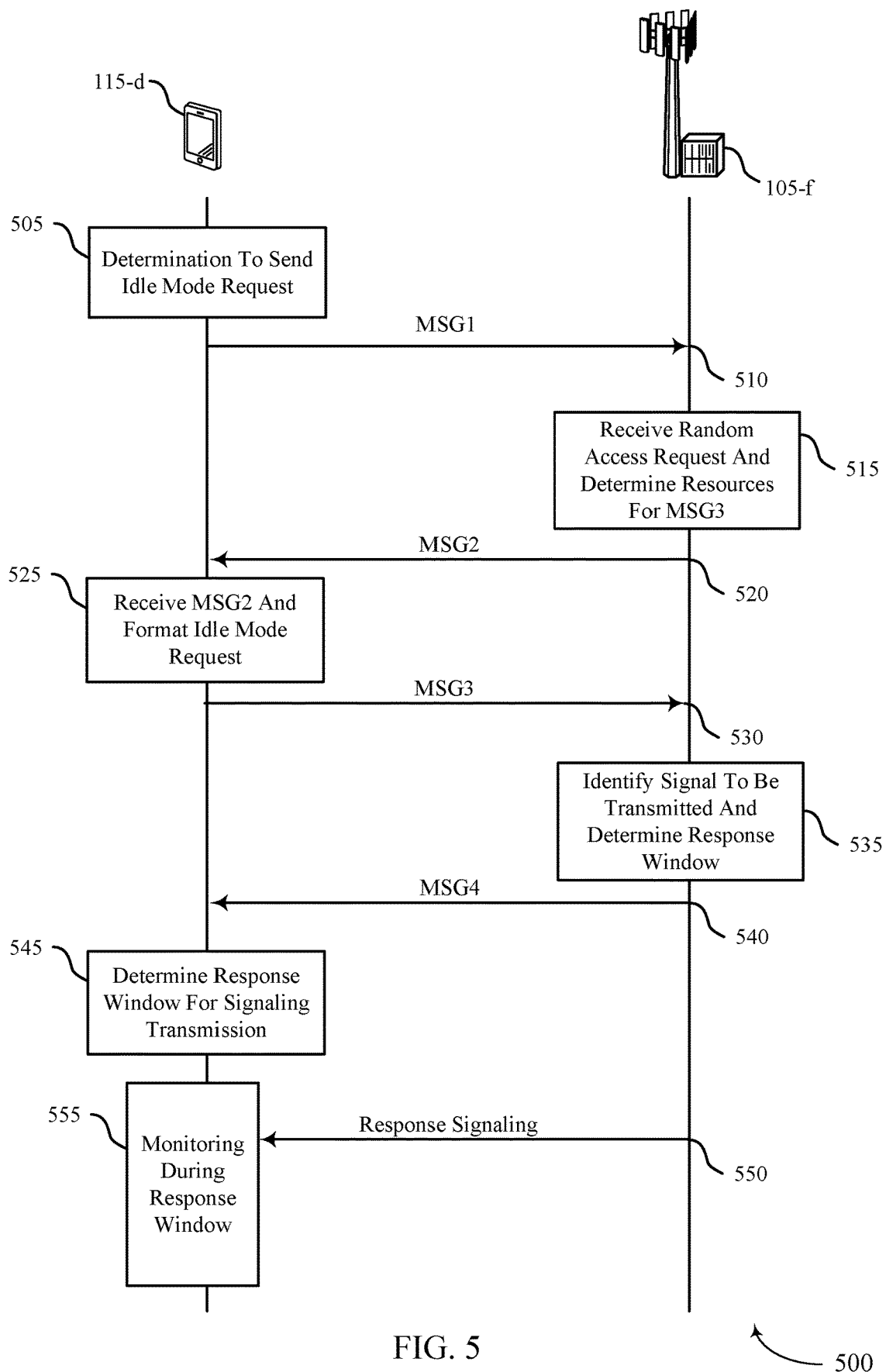
FIG. 5 illustrates an example of a process flow that supports random access techniques for idle mode requests in accordance with aspects of the present disclosure.

FIG. 5 illustrates an example of a process flow 500 that supports bandwidth configuration techniques in wireless communications in accordance with aspects of the present disclosure. In some examples, process flow 500 may implement aspects of wireless communications system 100 or 200. Process flow 500 includes a UE 115-*f*, and a base station 105-*f*, which may be respective examples of a UE 115 and a base station 105 as described with reference to FIGS. 1 and 2.

At 505, the UE 115-*d* may determine to send an idle mode request. In some cases, the UE 115-*d* may have entered idle mode after being in a connected mode with the base station 105-*f*. In some cases, the UE 115-*d* may determine that additional information is needed for maintaining efficient connectivity with the network, such as updated or additional system information, or additional positioning information to determine a more accurate UE 115-*d* position (e.g., a PRS from the direction of the second base station 105-*e*). The UE 115-*d* may initiate the idle mode request by initiating a random access procedure by transmitting a MSG1 transmission 510, in this example.

At 515, the first base station 105-*f* receive MSG1 and determine resources for a MSG3 transmission. In some cases, the base station 105-*f* may determine the type of idle mode request based on a random access preamble that was used in the random access message.

At 520, the base station 105-*f* may transmit a MSG2 transmission to the UE 115-*d*. In some cases, the MSG2 transmission may indicate resources that are to be used by the UE 115-*d* for a subsequent MSG3 transmission.

At 525, the UE 115-*d* may receive MSG2 and format the idle mode request. The idle mode request may be transmitted in MSG3 530 that is transmitted using the resources indicated by the base station 105-*f*.

At 535, the base station 105-*f* may identify the idle mode request and determine a response window based on the signaling request. The base station 105-*f* may transmit an indication of the response window in MSG4 540. At 545, the UE 115-*d* may determine a response window for the idle mode request.

At 550, the first base station 105-*f* may transmit response signaling, which may include the idle mode response. The UE 115-*d* may monitor for the response signaling during the identified response window at 555.

Figure 6:
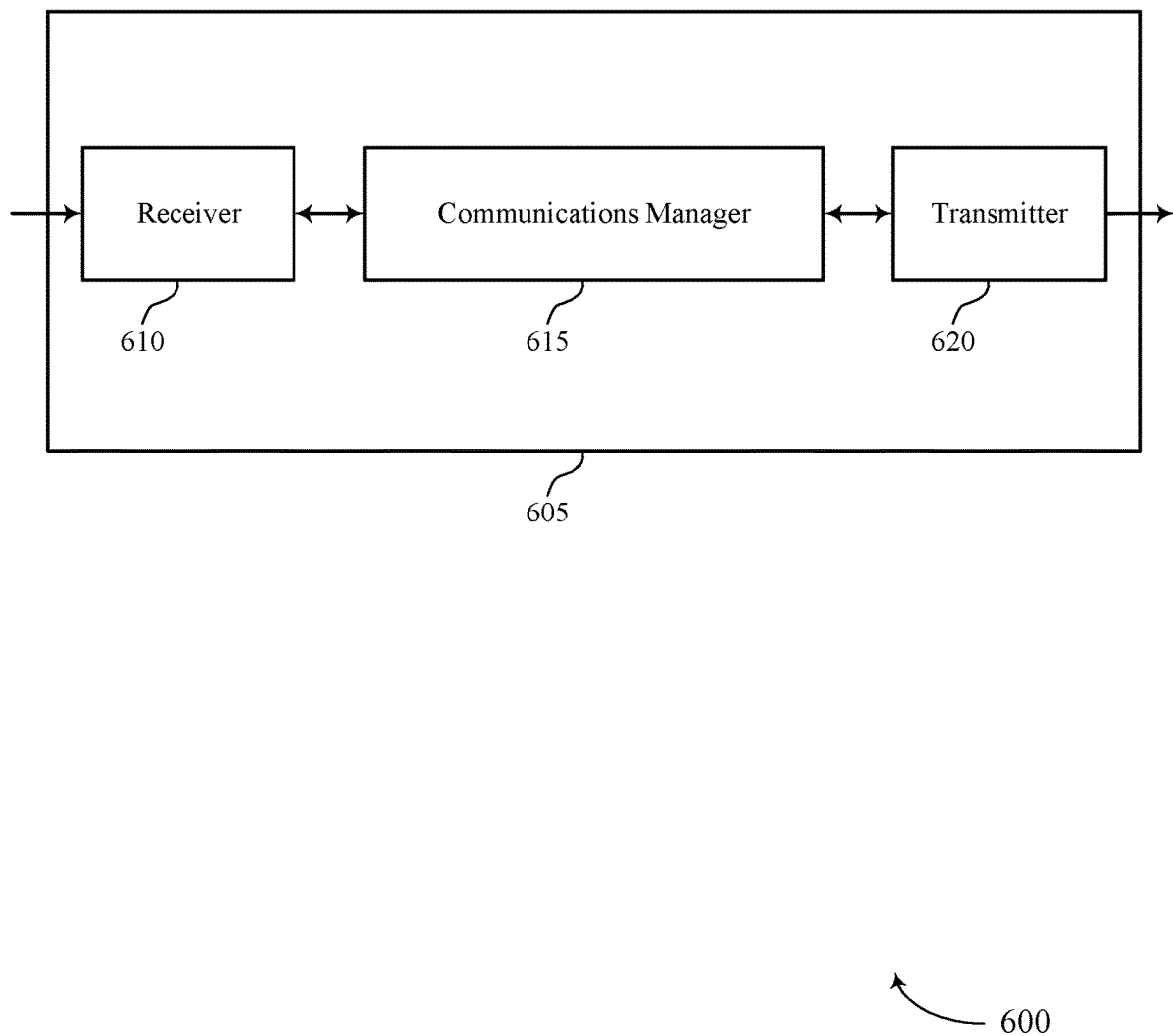
FIGS. 6 and 7 show block diagrams of devices that support random access techniques for idle mode requests in accordance with aspects of the present disclosure.

FIG. 6 shows a block diagram 600 of a device 605 that supports random access techniques for idle mode requests in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to random access techniques for idle mode requests, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit an idle mode request to a first base station using uplink random access channel resources, identify a response window for monitoring for a response to the idle mode request based on a request type of idle mode request, where the response window includes a first response window associated with a first request type or a second response window associated with a second request type, and the second response window is different than the first response window, and monitor downlink random access channel resources for the response to the idle mode request based on the identifying. The communications manager 615 may be an example of aspects of the communications manager 910 described herein.

The communications manager 615 as described herein may be implemented to realize one or more potential advantages. One implementation may allow a UE 115 to provide improved quality and reliability of service at the UE 115, as latency and delay in communications (e.g., involving special RACH messaging) of UE 115 may be reduced by identifying a response window for monitoring for a response to the idle mode request based on a request type of idle mode request. Another implementation may allow UE 115 to save power and increase battery life by avoiding having to stay awake in the case of long delays; instead UE 115 may go back to sleep more frequently between RACH signaling by using idle mode requests that use special random access channel signaling (e.g., RACH preamble, or format, or both) as further described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
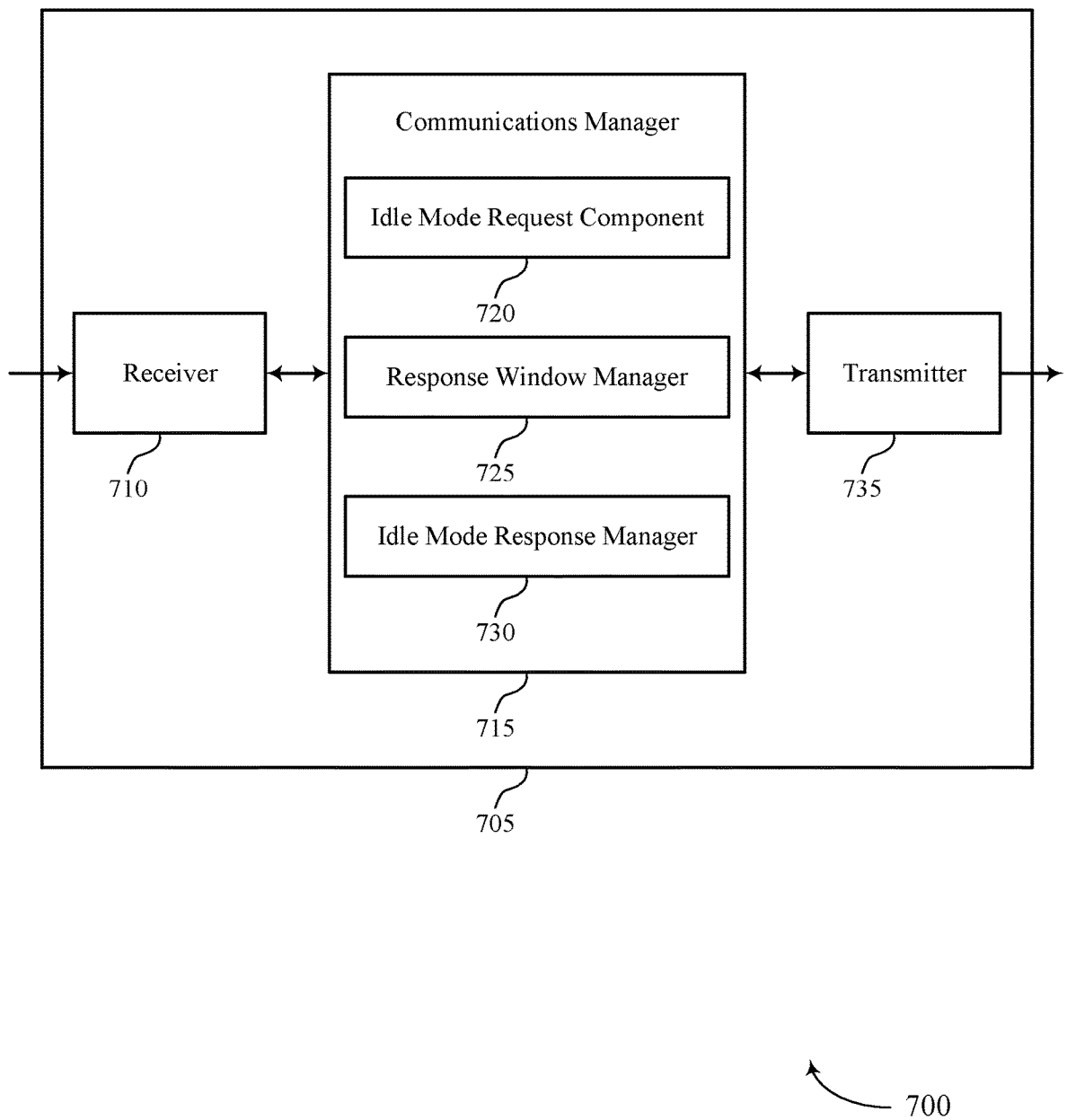

FIG. 7 shows a block diagram 700 of a device 705 that supports random access techniques for idle mode requests in accordance with aspects of the present disclosure. The device 705 may be an example of aspects of a device 605, or a UE 115 as described herein.

The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to random access techniques for idle mode requests, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an idle mode request component 720, a response window manager 725, and an idle mode response manager 730. The communications manager 715 may be an example of aspects of the communications manager 910 described herein.

The idle mode request component 720 may transmit an idle mode request to a first base station using uplink random access channel resources. The response window manager 725 may identify a response window for monitoring for a response to the idle mode request based on a request type of idle mode request, where the response window includes a first response window associated with a first request type or a second response window associated with a second request type, and the second response window is different than the first response window.

The idle mode response manager 730 may monitor downlink random access channel resources for the response to the idle mode request based on the identifying.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
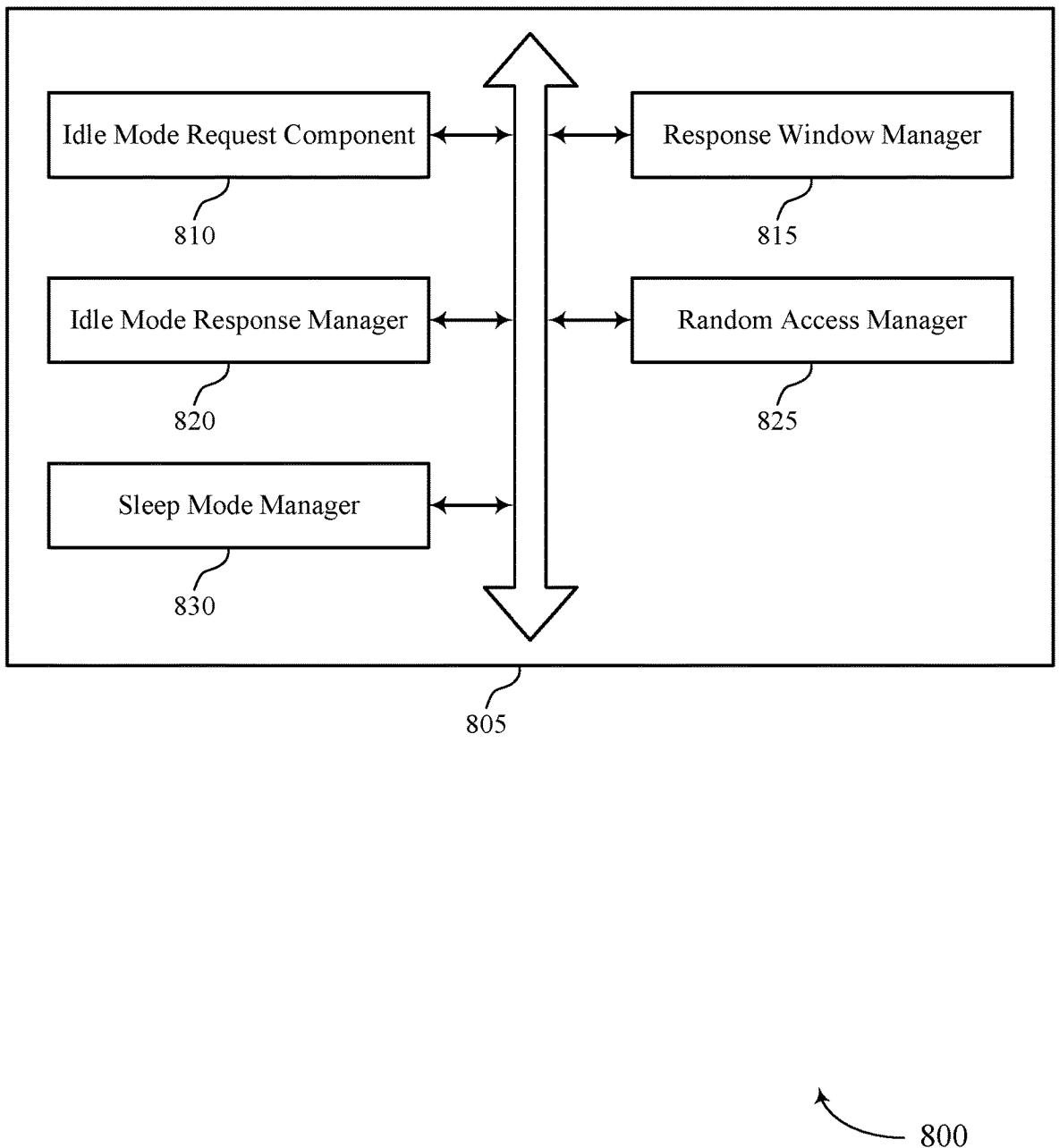
FIG. 8 shows a block diagram of a communications manager that supports random access techniques for idle mode requests in accordance with aspects of the present disclosure.

FIG. 8 shows a block diagram 800 of a communications manager 805 that supports random access techniques for idle mode requests in accordance with aspects of the present disclosure. The communications manager 805 may be an example of aspects of a communications manager 615, a communications manager 715, or a communications manager 910 described herein. The communications manager 805 may include an idle mode request component 810, a response window manager 815, an idle mode response manager 820, a random access manager 825, and a sleep mode manager 830. Each of these modules may communicate, directly or indirectly, with one another (e.g., via one or more buses).

The idle mode request component 810 may transmit an idle mode request to a first base station using uplink random access channel resources. In some examples, the idle mode request component 810 may transmit an initial idle mode request to the first base station in a first random access message (MSG1). In some cases, the idle mode request includes a request for a positioning reference signal (PRS) from an identified direction.

The response window manager 815 may identify a response window for monitoring for a response to the idle mode request based on a request type of idle mode request, where the response window includes a first response window associated with a first request type or a second response window associated with a second request type. In some cases, the second response window is different than the first response window. In some examples, the response window manager 815 may receive, responsive to the idle mode request, an indication of the response window from the first base station.

In some cases, the first request type corresponds to idle mode requests for which the first base station provides the response. In some cases, the second request type corresponds to idle mode requests for which coordination with a second base station is performed before providing the response. In some cases, the second response window has a later start time than the first response window, has a longer duration than the first response window, or combinations thereof. In some cases, the response window is for receiving a random access response message (MSG2) responsive to the MSG1 transmission. In some cases, the indication of the response window is received in random access message that indicates the first response window or the second response window for a subsequent random access message that includes the response to the idle mode request.

The idle mode response manager 820 may monitor downlink random access channel resources for the response to the idle mode request based on the identifying.

The random access manager 825 may transmit, prior to transmitting the idle mode request, a first random access request message (MSG1) to the first base station. In some examples, the random access manager 825 may receive, prior to transmitting the idle mode request and responsive to the MSG1 transmission, a random access response message (MSG2) from the base station, and where the idle mode request to the first base station is transmitted in a third random access message (MSG3). In some cases, the response window is different than a random access response window associated with a request for system access that is transmitted using the uplink random access channel resources.

The sleep mode manager 830 may initiate a sleep mode responsive to the indication of the response window and prior to the monitoring for the response to the idle mode request.

Figure 9:
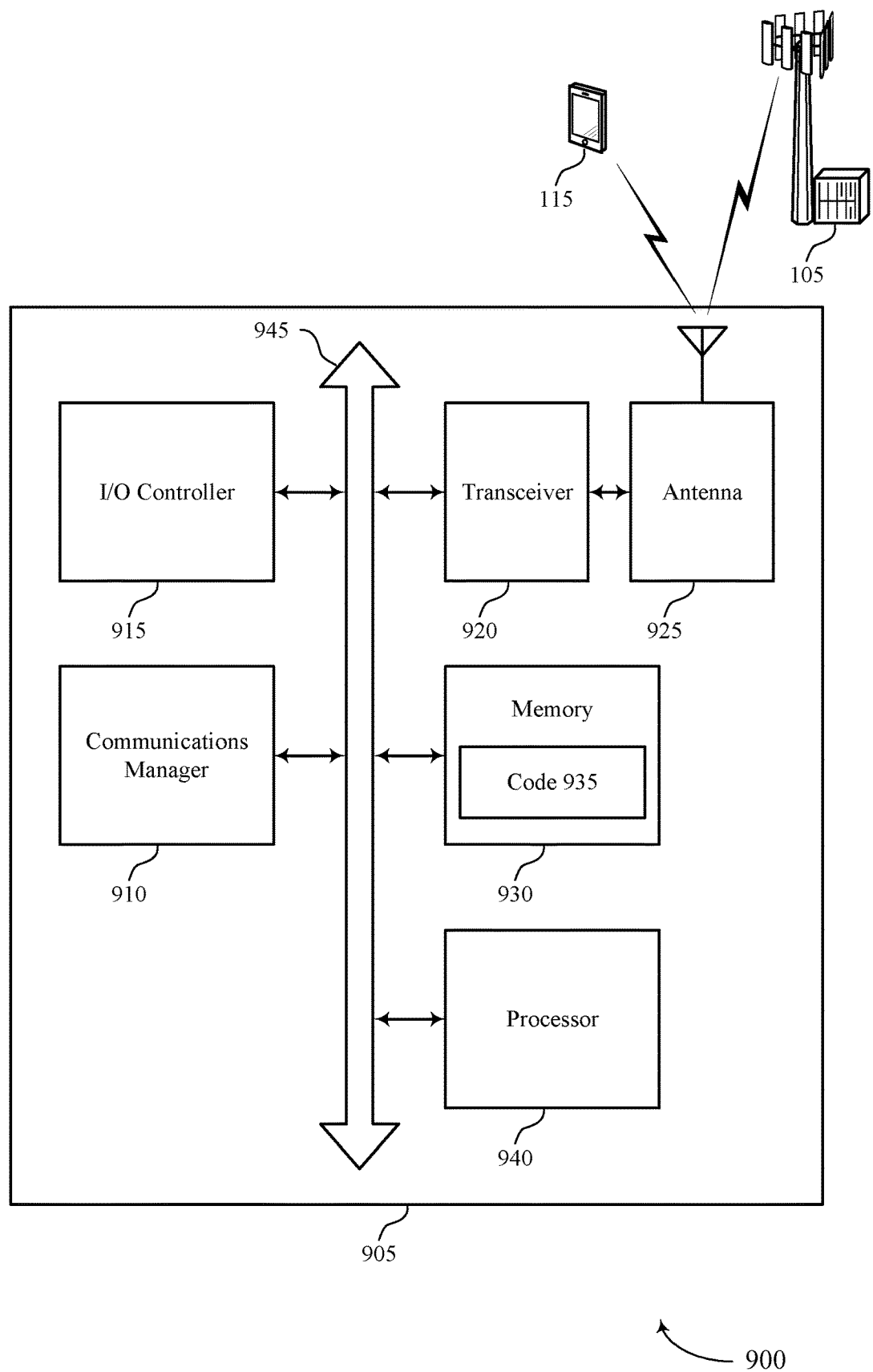
FIG. 9 shows a diagram of a system including a device that supports random access techniques for idle mode requests in accordance with aspects of the present disclosure.

FIG. 9 shows a diagram of a system 900 including a device 905 that supports random access techniques for idle mode requests in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit an idle mode request to a first base station using uplink random access channel resources, identify a response window for monitoring for a response to the idle mode request based on a request type of idle mode request, where the response window includes a first response window associated with a first request type or a second response window associated with a second request type, and the second response window is different than the first response window, and monitor downlink random access channel resources for the response to the idle mode request based on the identifying.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting random access techniques for idle mode requests).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
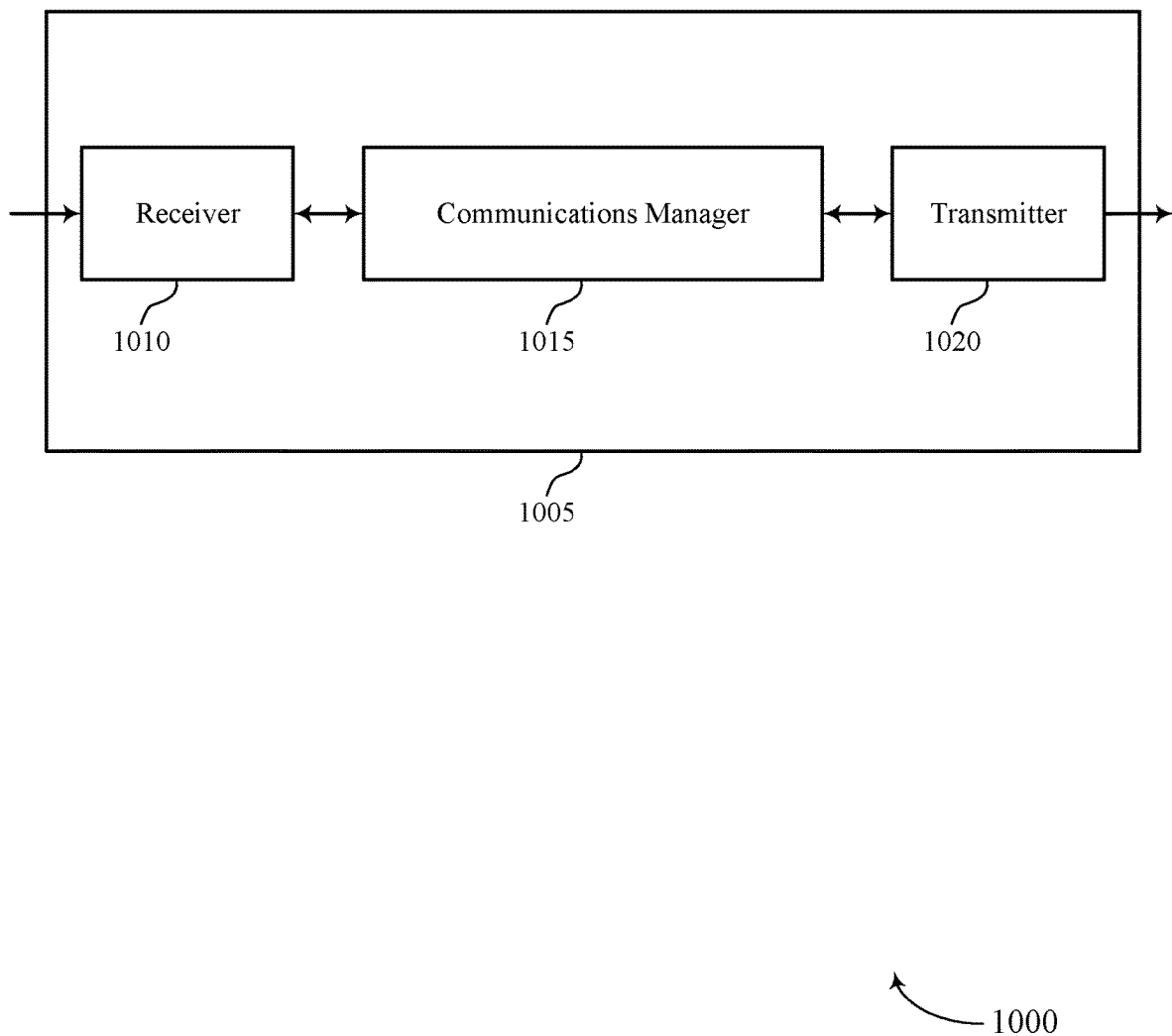
FIGS. 10 and 11 show block diagrams of devices that support random access techniques for idle mode requests in accordance with aspects of the present disclosure.

FIG. 10 shows a block diagram 1000 of a device 1005 that supports random access techniques for idle mode requests in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to random access techniques for idle mode requests, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, at a first base station, an idle mode request from a UE via uplink random access channel resources, identify a second base station that is to provide information for a response to the idle mode request based on a request type of idle mode request, and coordinate, responsive to the identifying, with the second base station to provide a response to the idle mode request. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
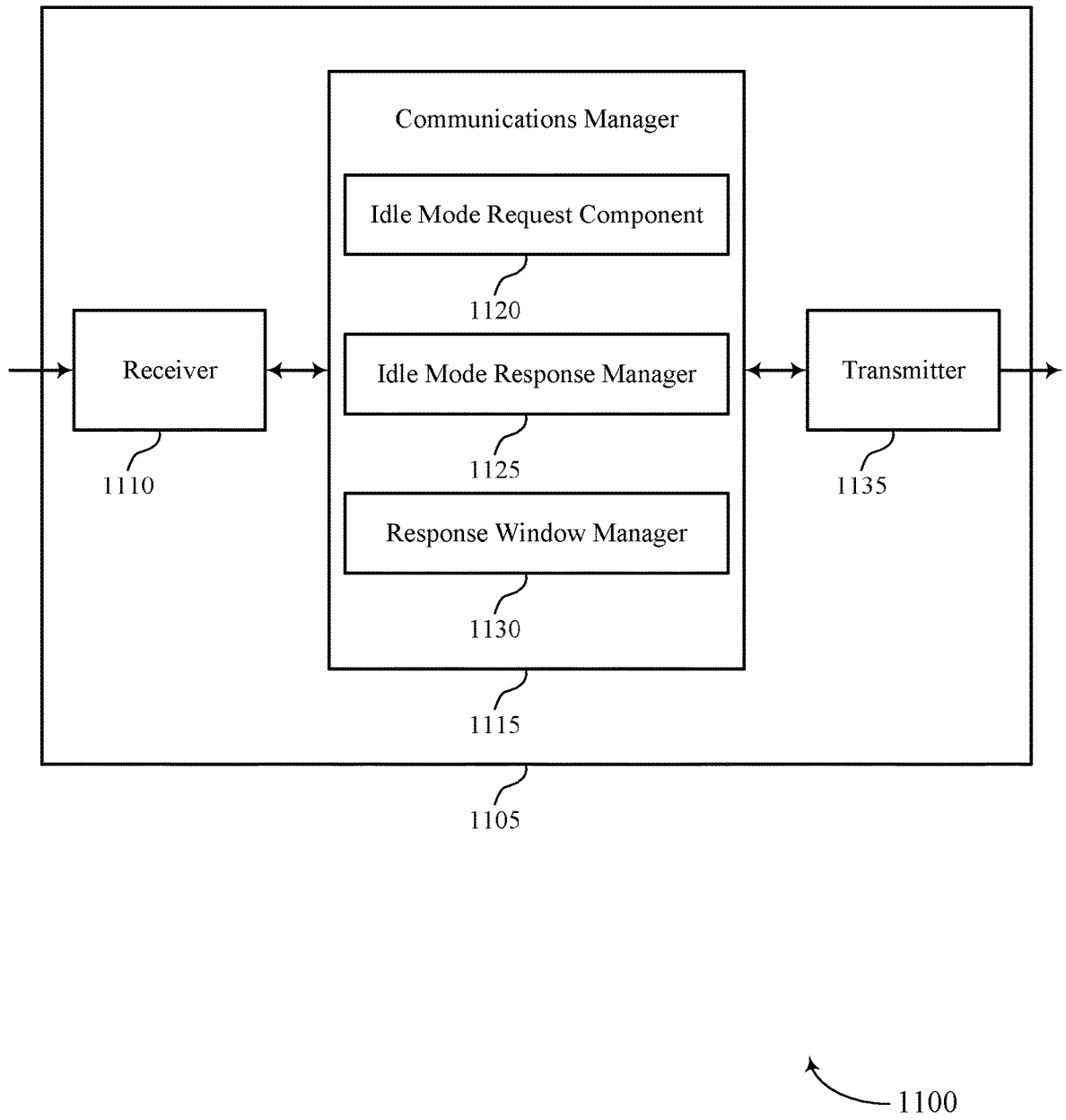

FIG. 11 shows a block diagram 1100 of a device 1105 that supports random access techniques for idle mode requests in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to random access techniques for idle mode requests, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an idle mode request component 1120, an idle mode response manager 1125, and a response window manager 1130. The communications manager 1115 may be an example of aspects of the communications manager 1310 described herein.

The idle mode request component 1120 may receive, at a first base station, an idle mode request from a UE via uplink random access channel resources.

The idle mode response manager 1125 may identify a second base station that is to provide information for a response to the idle mode request based on a request type of idle mode request.

The response window manager 1130 may coordinate, responsive to the identifying, with the second base station to provide a response to the idle mode request.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
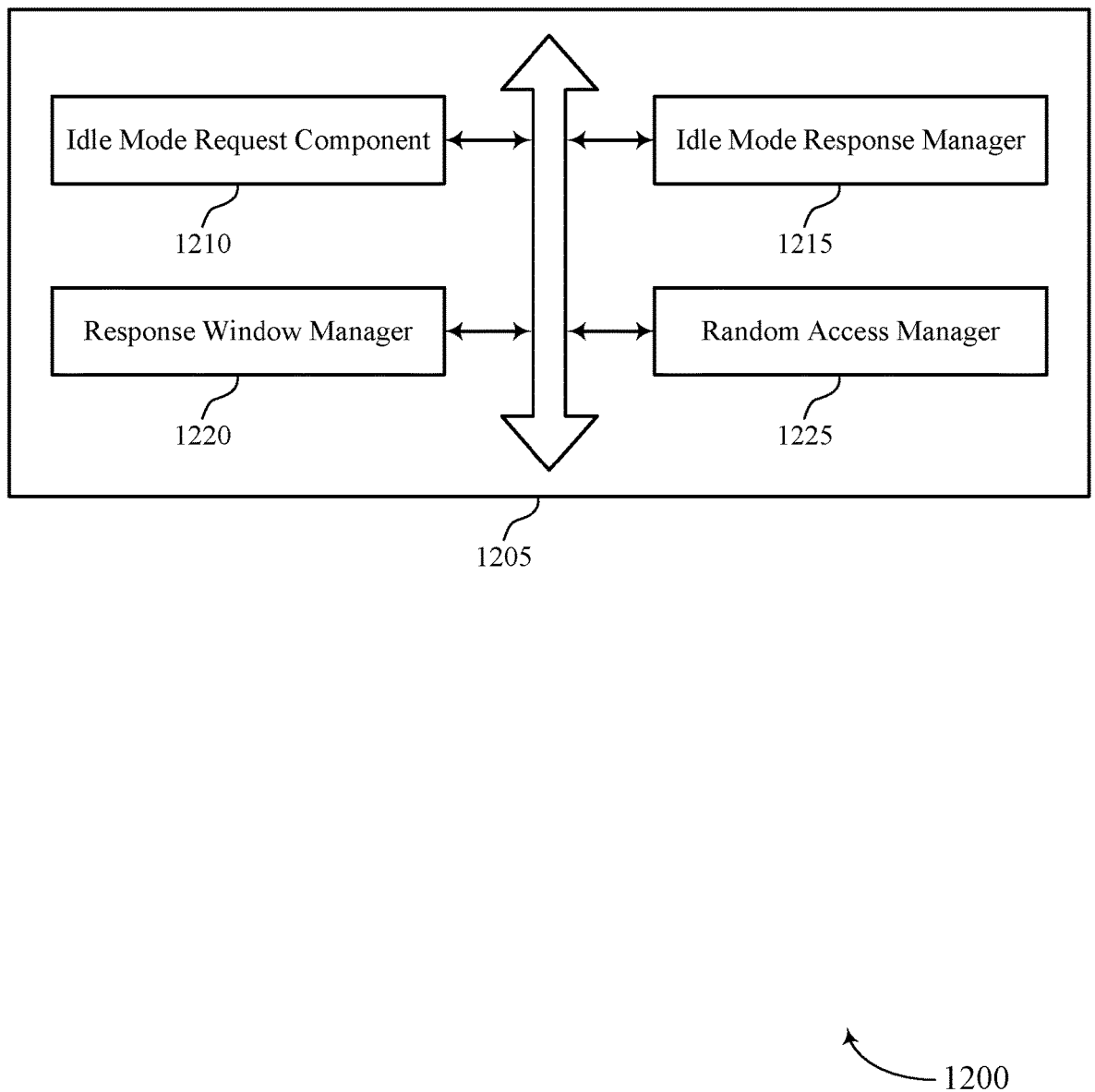
FIG. 12 shows a block diagram of a communications manager that supports random access techniques for idle mode requests in accordance with aspects of the present disclosure.

FIG. 12 shows a block diagram 1200 of a communications manager 1205 that supports random access techniques for idle mode requests in accordance with aspects of the present disclosure. The communications manager 1205 may be an example of aspects of a communications manager 1015, a communications manager 1115, or a communications manager 1310 described herein. The communications manager 1205 may include an idle mode request component 1210, an idle mode response manager 1215, a response window manager 1220, and a random access manager 1225. Each of these modules may communicate, directly or indirectly, with one another (e.g., via one or more buses).

The idle mode request component 1210 may receive, at a first base station, an idle mode request from a UE via uplink random access channel resources. In some examples, the idle mode request component 1210 may receive the idle mode request from the UE in a first random access message (MSG1). In some examples, the idle mode request component 1210 may determine that the second base station is located in the identified direction. In some cases, the idle mode request includes a request for a positioning reference signal (PRS) from an identified direction.

The idle mode response manager 1215 may identify a second base station that is to provide information for a response to the idle mode request based on a request type of idle mode request. In some examples, idle mode request component 1210 may determine that the second base station is located in the identified direction. In some cases, the idle mode response manager 1215 may coordinate with the second base station via one or more network nodes.

The response window manager 1220 may coordinate, responsive to the identifying, with the second base station to provide a response to the idle mode request. In some examples, the response window manager 1220 may transmit, responsive to the identifying, an indication to the UE of a response window for monitoring for a response to the idle mode request. In some cases, the response window is a second response window associated with the second base station, and where the second response window has a later start time than a first response window for a random access response of the first base station, has a longer duration than the first response window, or combinations thereof. In some cases, the response window is associated with a random access response message (MSG2) that is responsive to the idle mode request. In some cases, the response window is different than a random access response window associated with a request for system access that is transmitted using the uplink random access channel resources.

The random access manager 1225 may receive, at the first base station and prior to receiving the idle mode request, a first random access request message (MSG1) from the UE. In some examples, the random access manager 1225 may transmit, from the first base station, a random access response message (MSG2) to the UE, and where the idle mode request from the UE is received in a third random access message (MSG3). In some examples, the random access manager 1225 may transmit an indication to the UE that a response to the idle mode request will be transmitted in a separate random access message.

Figure 13:
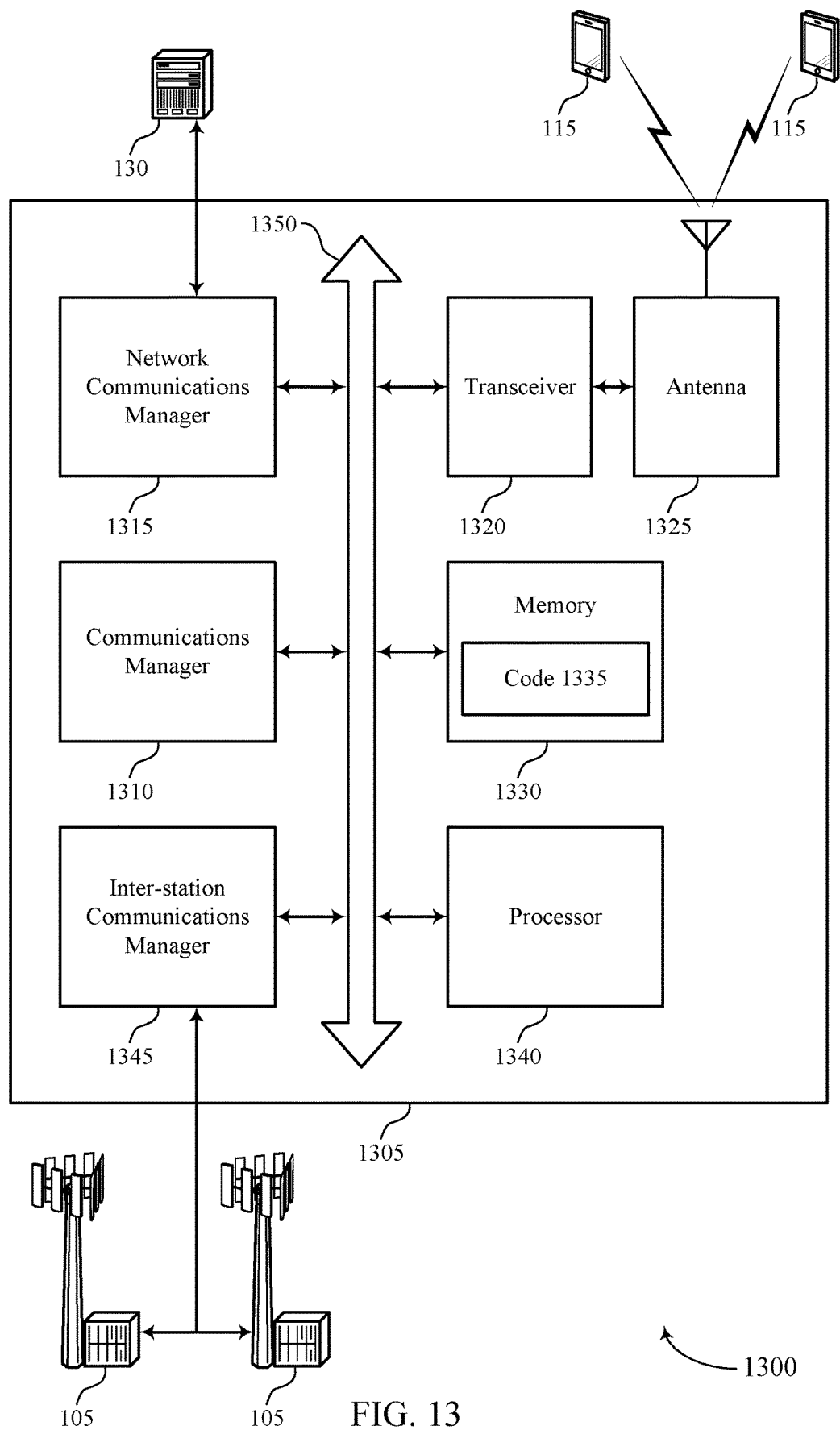
FIG. 13 shows a diagram of a system including a device that supports random access techniques for idle mode requests in accordance with aspects of the present disclosure.

FIG. 13 shows a diagram of a system 1300 including a device 1305 that supports random access techniques for idle mode requests in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, at a first base station, an idle mode request from a UE via uplink random access channel resources, identify a second base station that is to provide information for a response to the idle mode request based on a request type of idle mode request, and coordinate, responsive to the identifying, with the second base station to provide a response to the idle mode request.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting random access techniques for idle mode requests).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
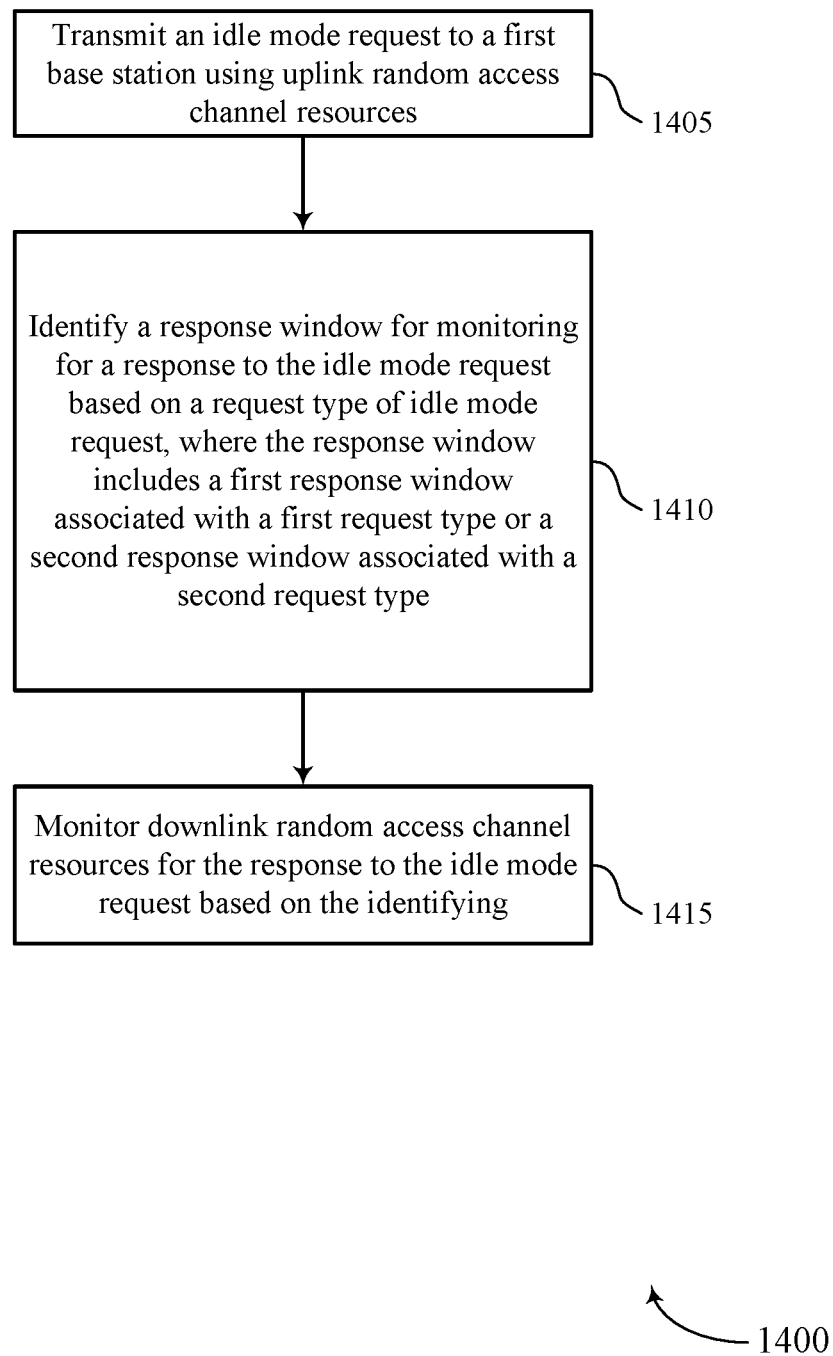
FIGS. 14 through 17 show flowcharts illustrating methods that support random access techniques for idle mode requests in accordance with aspects of the present disclosure.

FIG. 14 shows a flowchart illustrating a method 1400 that supports random access techniques for idle mode requests in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit an idle mode request to a first base station using uplink random access channel resources. The operations of 1405 may be performed according to the methods described herein. In some examples, aspects of the operations of 1405 may be performed by an idle mode request component as described with reference to FIGS. 6 through 9.

At 1410, the UE may identify a response window for monitoring for a response to the idle mode request based on a request type of idle mode request, where the response window includes a first response window associated with a first request type or a second response window associated with a second request type, and the second response window is different than the first response window. The operations of 1410 may be performed according to the methods described herein. In some examples, aspects of the operations of 1410 may be performed by a response window manager as described with reference to FIGS. 6 through 9.

At 1415, the UE may monitor downlink random access channel resources for the response to the idle mode request based on the identifying. The operations of 1415 may be performed according to the methods described herein. In some examples, aspects of the operations of 1415 may be performed by an idle mode response manager as described with reference to FIGS. 6 through 9.

Figure 15:
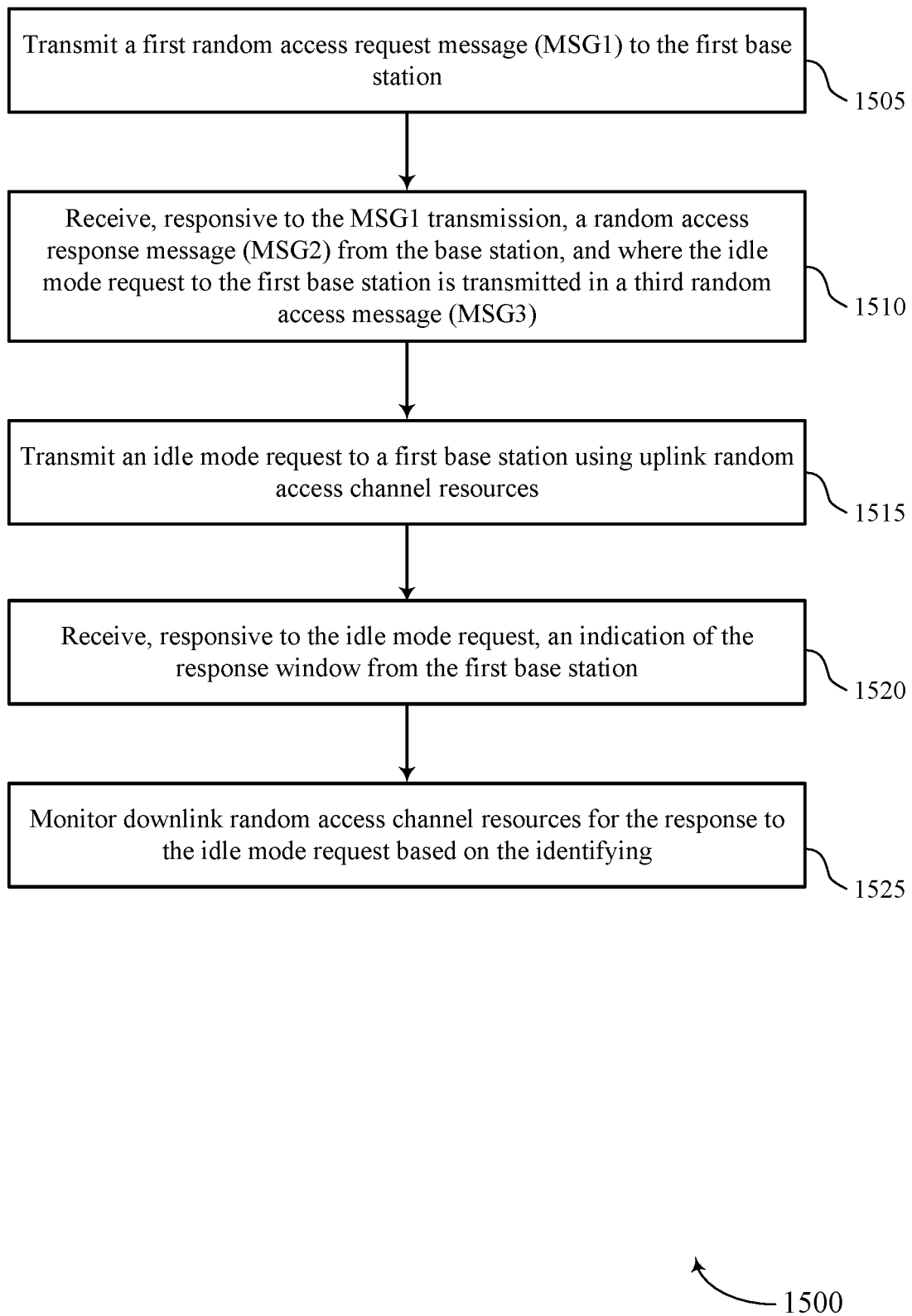

FIG. 15 shows a flowchart illustrating a method 1500 that supports random access techniques for idle mode requests in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit, prior to transmitting the idle mode request, a first random access request message (MSG1) to the first base station. The operations of 1505 may be performed according to the methods described herein. In some examples, aspects of the operations of 1505 may be performed by a random access manager as described with reference to FIGS. 6 through 9.

At 1510, the UE may receive, prior to transmitting the idle mode request and responsive to the MSG1 transmission, a random access response message (MSG2) from the base station, and where the idle mode request to the first base station is transmitted in a third random access message (MSG3). The operations of 1510 may be performed according to the methods described herein. In some examples, aspects of the operations of 1510 may be performed by a random access manager as described with reference to FIGS. 6 through 9.

At 1515, the UE may transmit an idle mode request to a first base station using uplink random access channel resources. The operations of 1515 may be performed according to the methods described herein. In some examples, aspects of the operations of 1515 may be performed by an idle mode request component as described with reference to FIGS. 6 through 9.

At 1520, the UE may receive, responsive to the idle mode request, an indication of the response window from the first base station. The operations of 1520 may be performed according to the methods described herein. In some examples, aspects of the operations of 1520 may be performed by a response window manager as described with reference to FIGS. 6 through 9.

At 1525, the UE may monitor downlink random access channel resources for the response to the idle mode request based on the identifying. The operations of 1525 may be performed according to the methods described herein. In some examples, aspects of the operations of 1525 may be performed by an idle mode response manager as described with reference to FIGS. 6 through 9.

Figure 16:
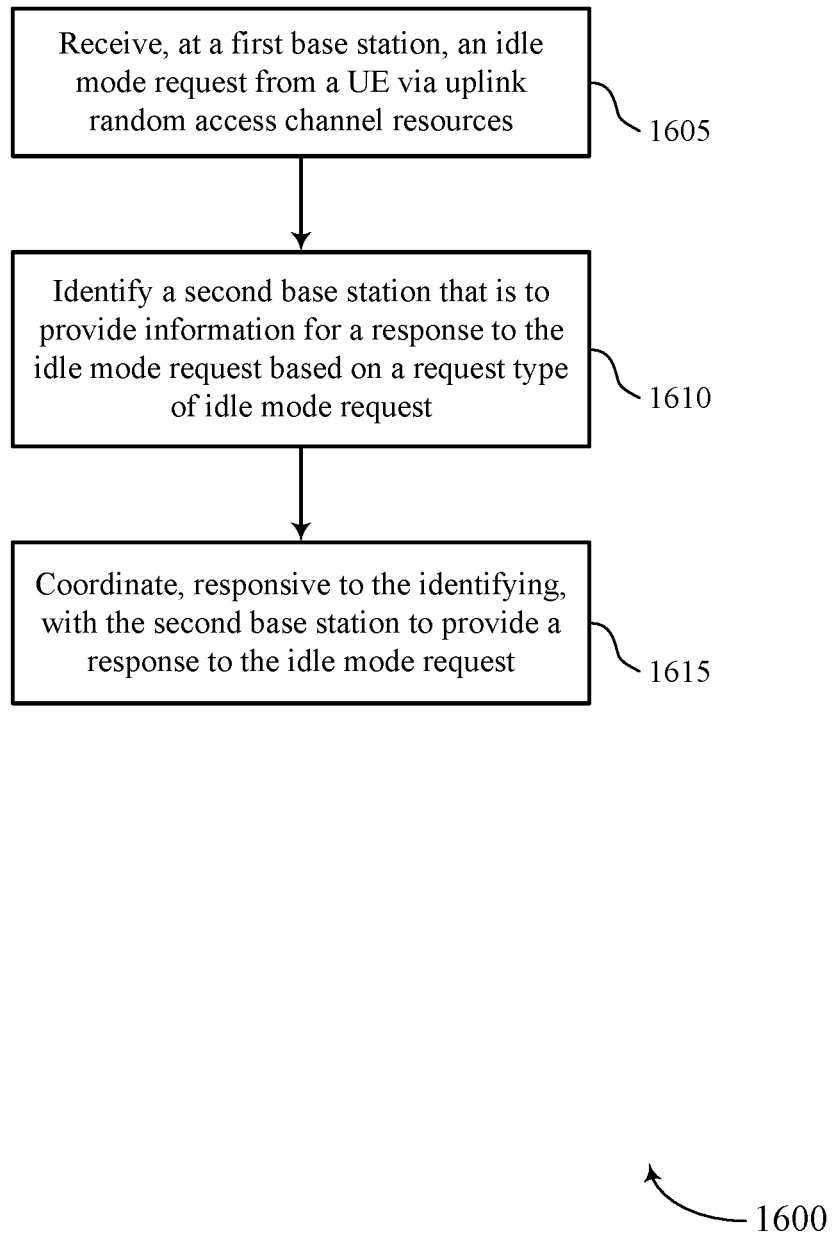

FIG. 16 shows a flowchart illustrating a method 1600 that supports random access techniques for idle mode requests in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may receive, at a first base station, an idle mode request from a UE via uplink random access channel resources. The operations of 1605 may be performed according to the methods described herein. In some examples, aspects of the operations of 1605 may be performed by an idle mode request component as described with reference to FIGS. 10 through 13.

At 1610, the base station may identify a second base station that is to provide information for a response to the idle mode request based on a request type of idle mode request. The operations of 1610 may be performed according to the methods described herein. In some examples, aspects of the operations of 1610 may be performed by an idle mode response manager as described with reference to FIGS. 10 through 13.

At 1615, the base station may coordinate, responsive to the identifying, with the second base station to provide a response to the idle mode request. The operations of 1615 may be performed according to the methods described herein. In some examples, aspects of the operations of 1615 may be performed by a response window manager as described with reference to FIGS. 10 through 13.

Figure 17:
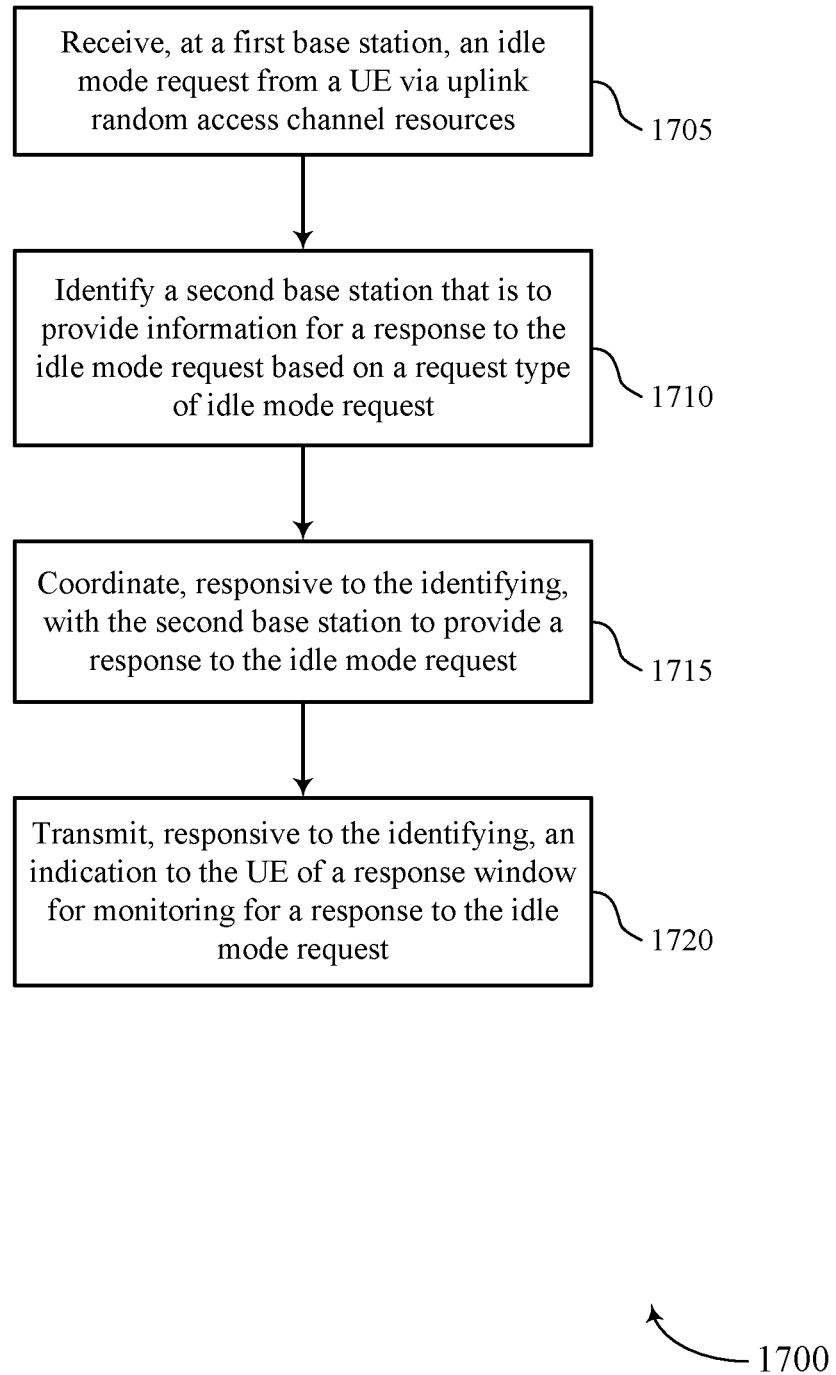

FIG. 17 shows a flowchart illustrating a method 1700 that supports random access techniques for idle mode requests in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, at a first base station, an idle mode request from a UE via uplink random access channel resources. The operations of 1705 may be performed according to the methods described herein. In some examples, aspects of the operations of 1705 may be performed by an idle mode request component as described with reference to FIGS. 10 through 13.

At 1710, the base station may identify a second base station that is to provide information for a response to the idle mode request based on a request type of idle mode request. The operations of 1710 may be performed according to the methods described herein. In some examples, aspects of the operations of 1710 may be performed by an idle mode response manager as described with reference to FIGS. 10 through 13.

At 1715, the base station may coordinate, responsive to the identifying, with the second base station to provide a response to the idle mode request. The operations of 1715 may be performed according to the methods described herein. In some examples, aspects of the operations of 1715 may be performed by a response window manager as described with reference to FIGS. 10 through 13.

At 1720, the base station may transmit, responsive to the identifying, an indication to the UE of a response window for monitoring for a response to the idle mode request. The operations of 1720 may be performed according to the methods described herein. In some examples, aspects of the operations of 1720 may be performed by a response window manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting an idle mode request to a first base station using uplink random access channel resources;
   identifying a response window for monitoring for a response to the idle mode request based at least in part on a request type of the idle mode request, wherein the response window comprises a first response window associated with a first request type or a second response window associated with a second request type; and
   monitoring downlink random access channel resources for the response to the idle mode request based at least in part on the identifying.

2. The method of claim 1, wherein:
   the first request type corresponds to idle mode requests for which the first base station provides the response; and
   the second request type corresponds to idle mode requests for which coordination with a second base station is performed before providing the response.

3. The method of claim 2, wherein the second response window has a later start time than the first response window, has a longer duration than the first response window, or combinations thereof.

4. The method of claim 1, wherein the transmitting the idle mode request further comprises:
transmitting an initial idle mode request to the first base station in a first random access message (MSG1).

5. The method of claim 4, wherein the response window is for receiving a random access response message (MSG2) responsive to the MSG1 transmission.

6. The method of claim 1, further comprising:
transmitting, prior to transmitting the idle mode request, a first random access request message (MSG1) to the first base station; and
receiving, prior to transmitting the idle mode request and responsive to the MSG1 transmission, a random access response message (MSG2) from the first base station, and wherein the idle mode request to the first base station is transmitted in a third random access message (MSG3).

7. The method of claim 1, wherein the response window is different than a random access response window associated with a request for system access that is transmitted using the uplink random access channel resources.

8. The method of claim 1, further comprising:
receiving, responsive to the idle mode request, an indication of the response window from the first base station.

9. The method of claim 8, wherein the indication of the response window is received in random access message that indicates the first response window or the second response window for a subsequent random access message that includes the response to the idle mode request.

10. The method of claim 8, further comprising:
initiating a sleep mode responsive to the indication of the response window and prior to the monitoring for the response to the idle mode request.

11. The method of claim 1, wherein the idle mode request comprises a request for a positioning reference signal (PRS) from an identified direction.

12. A method for wireless communication, comprising:
receiving, at a first base station, an idle mode request from a user equipment (UE) via uplink random access channel resources;
identifying a second base station that is to provide information for a response to the idle mode request based at least in part on a request type of the idle mode request; and
coordinating, responsive to the identifying, with the second base station to provide the response to the idle mode request.

13. The method of claim 12, further comprising:
transmitting, responsive to the identifying, an indication to the UE of a response window for monitoring for the response to the idle mode request.

14. The method of claim 13, wherein the response window is a second response window associated with the second base station, and wherein the second response window has a later start time than a first response window for a random access response of the first base station, has a longer duration than the first response window, or combinations thereof.

15. The method of claim 13, wherein the response window is associated with a random access response message (MSG2) that is responsive to the idle mode request.

16. The method of claim 13, wherein the response window is different than a random access response window associated with a request for system access that is transmitted using the uplink random access channel resources.

17. The method of claim 12, wherein the receiving the idle mode request further comprises:
receiving the idle mode request from the UE in a first random access message (MSG1).

18. The method of claim 12, further comprising:
receiving, at the first base station and prior to receiving the idle mode request, a first random access request message (MSG1) from the UE; and
transmitting, from the first base station, a random access response message (MSG2) to the UE, and wherein the idle mode request from the UE is received in a third random access message (MSG3).

19. The method of claim 12, further comprising:
transmitting an indication to the UE that the response to the idle mode request will be transmitted in a separate random access message.

20. The method of claim 12, wherein the idle mode request comprises a request for a positioning reference signal (PRS) from an identified direction.

21. The method of claim 20, wherein the identifying the second base station comprises:
determining that the second base station is located in the identified direction.

22. The method of claim 20, wherein the identifying the second base station comprises:
coordinating with the second base station via one or more network nodes.

23. An apparatus for wireless communication, comprising:
a processor,
memory coupled to the processor; and
instructions stored in the memory and executable by the processor to cause the apparatus to:
transmit an idle mode request to a first base station using uplink random access channel resources;
identify a response window for monitoring for a response to the idle mode request based at least in part on a request type of the idle mode request, wherein the response window comprises a first response window associated with a first request type or a second response window associated with a second request type; and
monitor downlink random access channel resources for the response to the idle mode request based at least in part on the identifying.

24. The apparatus of claim 23, wherein:
the first request type corresponds to idle mode requests for which the first base station provides the response; and
the second request type corresponds to idle mode requests for which coordination with a second base station is performed before providing the response.

25. The apparatus of claim 24, wherein the second response window has a later start time than the first response window, has a longer duration than the first response window, or combinations thereof.

26. The apparatus of claim 23, wherein the transmitting the idle mode request further comprises:
transmit an initial idle mode request to the first base station in a first random access message (MSG1).

27. The apparatus of claim 23, wherein the instructions are further executable by the processor to cause the apparatus to:

transmit, prior to transmitting the idle mode request, a first random access request message (MSG1) to the first base station; and receive, prior to transmitting the idle mode request and responsive to the MSG1 transmission, a random access response message (MSG2) from the first base station, and wherein the idle mode request to the first base station is transmitted in a third random access message (MSG3).

28. An apparatus for wireless communication, comprising:

a processor, memory coupled to the processor; and instructions stored in the memory and executable by the processor to cause the apparatus to:

receive, at a first base station, an idle mode request from a user equipment (UE) via uplink random access channel resources;

identify a second base station that is to provide information for a response to the idle mode request based at least in part on a request type of idle mode request; and coordinate, responsive to the identifying, with the second base station to provide the response to the idle mode request.

29. The apparatus of claim 28, wherein the instructions are further executable by the processor to cause the apparatus to:

transmit, responsive to the identifying, an indication to the UE of a response window for monitoring for the response to the idle mode request.

30. The apparatus of claim 29, wherein the response window is a second response window associated with the second base station, and wherein the second response window has a later start time than a first response window for a random access response of the first base station, has a longer duration than the first response window, or combinations thereof.

* * * * *